(12) United States Patent
Hontz et al.

(10) Patent No.: US 10,281,075 B2
(45) Date of Patent: May 7, 2019

(54) QUICK DISCONNECT COUPLING FOR CONDUIT

(71) Applicant: Campbell Fittings, Inc., Boyertown, PA (US)

(72) Inventors: Matthew R. Hontz, Allentown, PA (US); Thomas J. Paff, Valley Forge, PA (US)

(73) Assignee: Campbell Fittings, Inc., Boyertown, PA (US)

( * ) Notice: Subject to any disclaimer, the term of this patent is extended or adjusted under 35 U.S.C. 154(b) by 246 days.

(21) Appl. No.: 15/351,787

(22) Filed: Nov. 15, 2016

(65) Prior Publication Data

US 2018/0135788 A1    May 17, 2018

(51) Int. Cl.
*F16L 37/12*     (2006.01)
*F16L 37/138*    (2006.01)

(52) U.S. Cl.
CPC ........... *F16L 37/121* (2013.01); *F16L 37/122* (2013.01); *F16L 37/138* (2013.01)

(58) Field of Classification Search
CPC ......... F16L 37/10; F16L 37/12; F16L 37/121; F16L 37/127; F16L 37/122; F16L 37/16
USPC .................................................. 285/315, 314
See application file for complete search history.

(56) References Cited

U.S. PATENT DOCUMENTS

| | | | | |
|---|---|---|---|---|
| 1,879,364 A | * | 9/1932 | Lomar | F16L 37/23 285/314 |
| 2,463,179 A | * | 3/1949 | Iftiger, Sr. | F16L 37/10 285/314 |
| 2,518,026 A | | 8/1950 | Krapp | |
| 2,860,893 A | | 11/1958 | Clark | |
| 2,888,278 A | * | 5/1959 | Torres | F16L 37/127 285/313 |
| 3,028,179 A | * | 4/1962 | Abramoska | F16L 37/127 137/614.04 |
| 3,097,867 A | | 7/1963 | Saloum | |
| 3,124,374 A | | 3/1964 | Krapp | |
| 3,140,884 A | | 7/1964 | Brauck | |
| 3,359,015 A | | 12/1967 | Zahuranec | |
| 3,420,497 A | | 1/1969 | Wilcox | |
| 3,847,393 A | * | 11/1974 | Busselmeier | F16L 33/222 285/243 |
| 3,976,313 A | | 8/1976 | Lauffenburger | |
| 3,997,197 A | * | 12/1976 | Marsh | B23Q 1/0018 285/93 |
| 4,041,729 A | | 8/1977 | Bilz | |
| 4,213,482 A | | 7/1980 | Gondek | |
| 4,222,593 A | | 9/1980 | Lauffenburger | |

(Continued)

*Primary Examiner* — Aaron M Dunwoody
(74) *Attorney, Agent, or Firm* — RatnerPrestia

(57) ABSTRACT

A coupling includes a housing having a wall defining an interior space and extending along a central longitudinal axis. A ring is movably mounted with respect to the wall. At least one moveable member has an engagement surface for engaging with an adapter that is positionable within the interior space of the housing. One or more ramps are defined on the ring for (i) moving the engagement surface of the moveable member toward the central longitudinal axis upon moving the ring in one direction in order to engage the coupling to the adapter, and (ii) moving the engagement surface of the moveable member away from the central longitudinal axis upon moving the ring in an opposite direction in order to disengage the coupling from the adapter.

19 Claims, 17 Drawing Sheets

(56) References Cited

U.S. PATENT DOCUMENTS

| | | |
|---|---|---|
| 4,527,816 A | 7/1985 | Bresie |
| 4,691,942 A | 9/1987 | Ford |
| 4,702,537 A | 10/1987 | Mattingly |
| 4,776,614 A | 10/1988 | Marrison |
| 4,802,694 A | 2/1989 | Vargo |
| 4,813,810 A | 3/1989 | Suzuki |
| 4,877,219 A | 10/1989 | Yano |
| 4,924,909 A | 5/1990 | Wilcox |
| 4,951,391 A | 8/1990 | Seabra |
| 4,988,129 A | 1/1991 | Saito |
| 5,005,876 A | 4/1991 | Fahl |
| 5,029,904 A | 7/1991 | Hunt |
| 5,042,844 A | 8/1991 | Iida |
| 5,042,850 A | 8/1991 | Culler |
| 5,066,049 A | 11/1991 | Staples |
| 5,076,324 A | 12/1991 | Herman |
| 5,092,364 A | 3/1992 | Mullins |
| 5,118,303 A | 6/1992 | LeBaron |
| 5,230,538 A | 7/1993 | Kobayashi |
| 5,240,289 A | 8/1993 | Gottling |
| 5,255,714 A | 10/1993 | Mullins |
| 5,295,717 A | 3/1994 | Chen |
| 5,338,069 A | 8/1994 | McCarthy |
| 5,368,343 A | 11/1994 | Allen |
| 5,435,604 A | 7/1995 | Chen |
| 5,458,501 A | 10/1995 | Lazaro, Jr. |
| 5,462,316 A | 10/1995 | Street |
| 5,540,250 A | 7/1996 | Mullins |
| 5,553,895 A | 9/1996 | Kari |
| 5,707,340 A * | 1/1998 | Hipp .................. A61B 1/00195 285/314 |
| 5,779,277 A | 7/1998 | Street |
| 5,782,502 A | 7/1998 | Lewis |
| 5,833,277 A | 11/1998 | Reinert |
| 5,896,889 A | 4/1999 | Menard |
| 5,918,913 A | 7/1999 | Lewis |
| 5,975,591 A | 11/1999 | Guest |
| 5,988,693 A | 11/1999 | Street |
| 6,206,431 B1 | 3/2001 | Street |
| 6,206,432 B1 | 3/2001 | Kamiyama |
| 6,257,278 B1 | 7/2001 | Danielson |
| 6,302,451 B1 | 10/2001 | Olson |
| 6,354,564 B1 | 3/2002 | Van Scyoc |
| 6,386,596 B1 | 5/2002 | Olson |
| 6,508,274 B2 | 1/2003 | Street |
| 6,523,863 B2 | 2/2003 | Ishiwata |
| 6,561,523 B1 | 5/2003 | Wienhold |
| 6,786,516 B2 | 9/2004 | Cronley |
| 6,863,314 B2 | 3/2005 | Guest |
| 6,957,833 B2 | 10/2005 | Guest |
| 7,140,645 B2 | 11/2006 | Cronley |
| 7,213,845 B2 | 5/2007 | Sato |
| 7,543,857 B2 | 6/2009 | Dole |
| 7,543,858 B1 * | 6/2009 | Wang .................. F16L 37/0982 285/314 |
| 7,887,104 B1 | 2/2011 | Wilson |
| 7,926,855 B2 | 4/2011 | Kitagawa |
| 8,172,276 B1 | 5/2012 | King |
| 8,181,997 B2 * | 5/2012 | Wang .................. F16L 37/138 285/24 |
| 8,206,172 B2 | 6/2012 | Katagiri |
| 8,366,154 B2 * | 2/2013 | Wang .................. F16L 37/133 285/314 |
| 8,375,550 B2 | 2/2013 | Swift |
| 8,596,691 B2 | 12/2013 | King |
| 8,662,541 B2 | 3/2014 | King |
| 9,068,680 B1 | 6/2015 | Crompton |
| 9,203,180 B2 | 12/2015 | Mosier |
| 9,217,524 B2 | 12/2015 | Nick |
| 2005/0266713 A1 | 12/2005 | Bordeau |
| 2007/0278791 A1 * | 12/2007 | Tiberghien ............ F16L 37/086 285/315 |
| 2009/0004906 A1 | 1/2009 | Koch |
| 2013/0019973 A1 | 1/2013 | Gose |
| 2013/0056976 A1 | 3/2013 | Kim |
| 2013/0320672 A1 | 12/2013 | Steele |
| 2014/0210203 A1 * | 7/2014 | Lorkowsi .............. F16L 37/096 285/88 |
| 2014/0319823 A1 * | 10/2014 | Happich ................ F16L 37/10 285/309 |
| 2014/0373949 A1 | 12/2014 | Manzato |
| 2015/0107705 A1 | 4/2015 | Fahl |
| 2015/0159799 A1 | 6/2015 | Taneya |
| 2015/0345684 A1 | 12/2015 | Kujawski, Jr. |

* cited by examiner

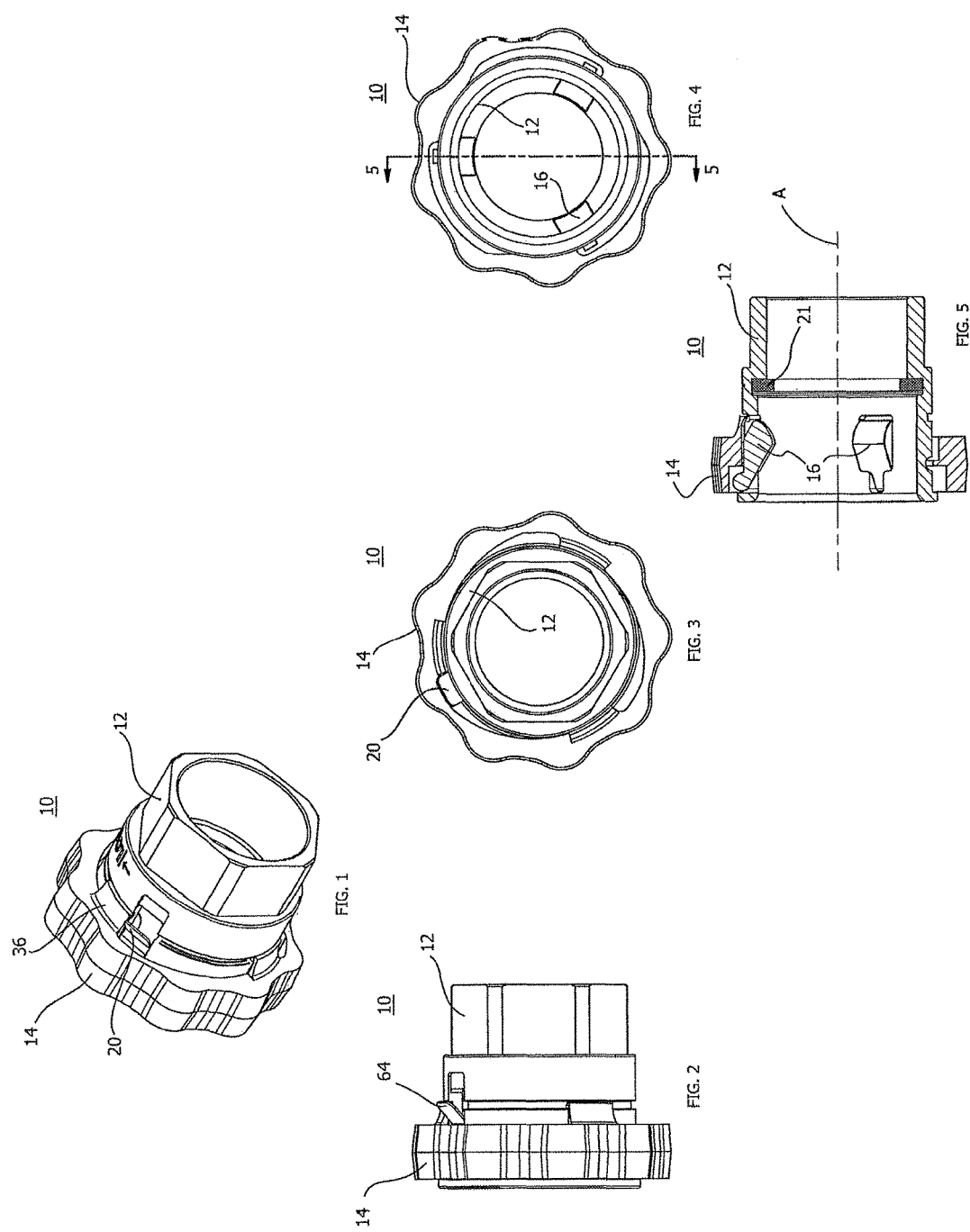

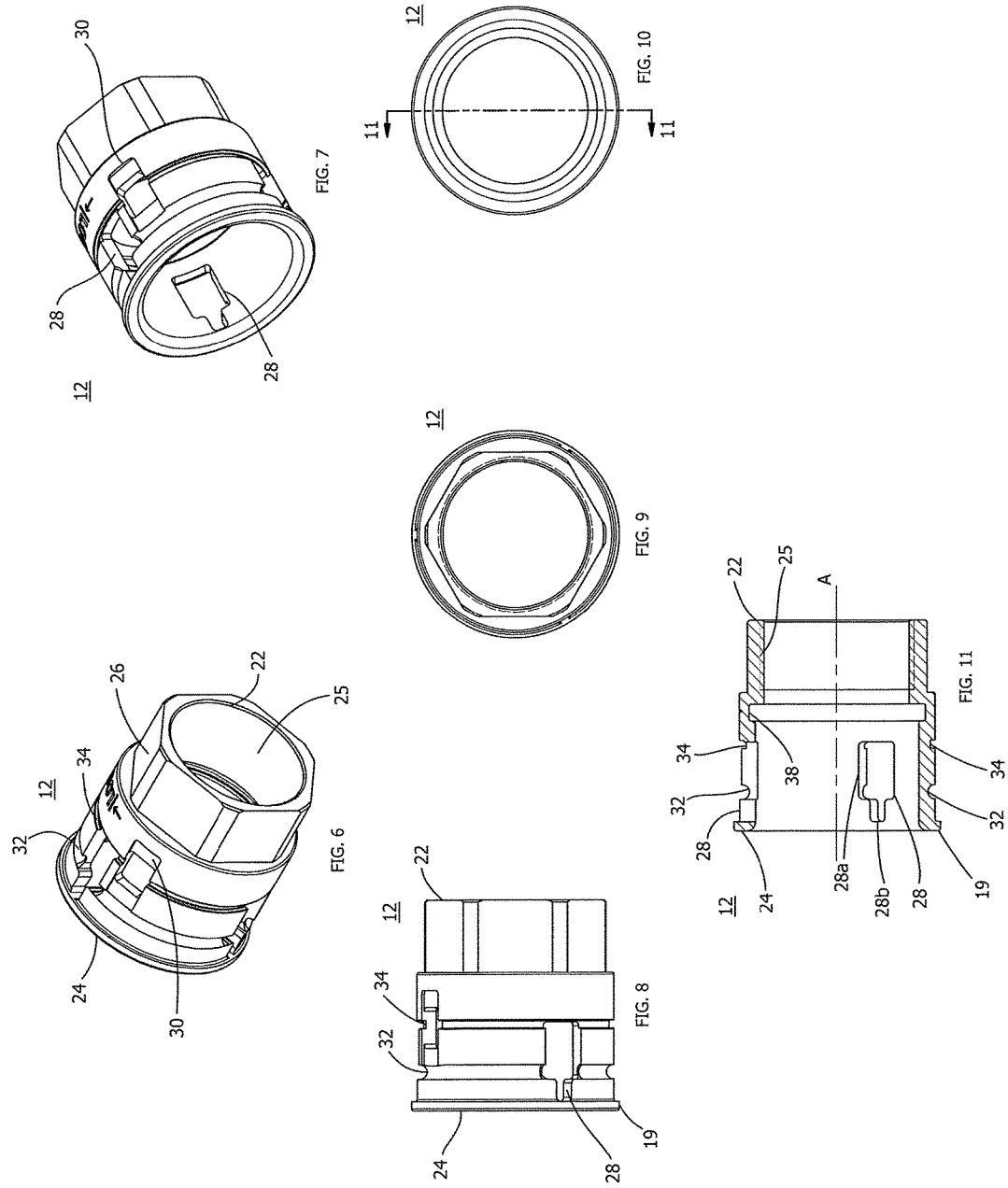

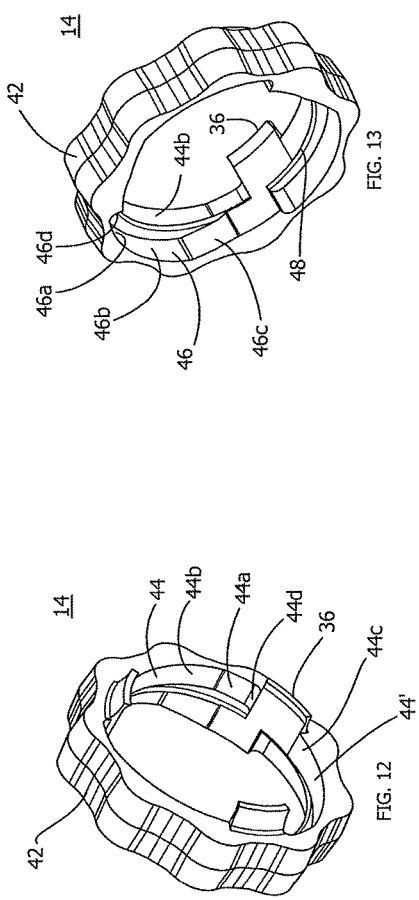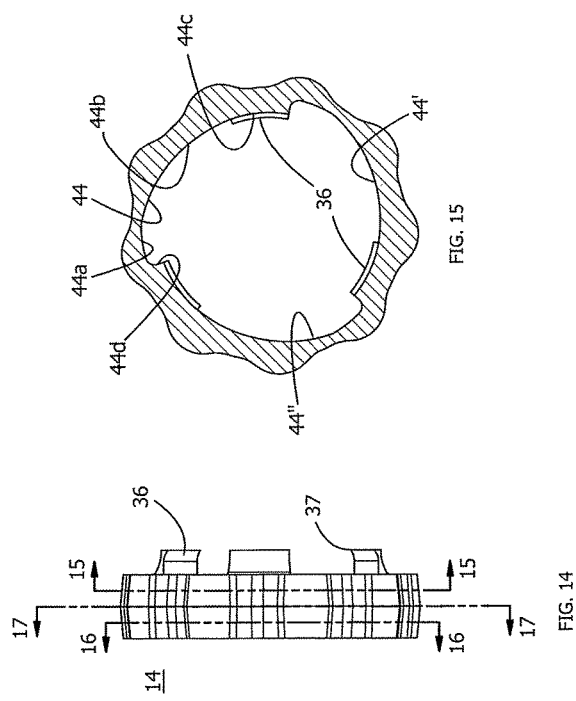

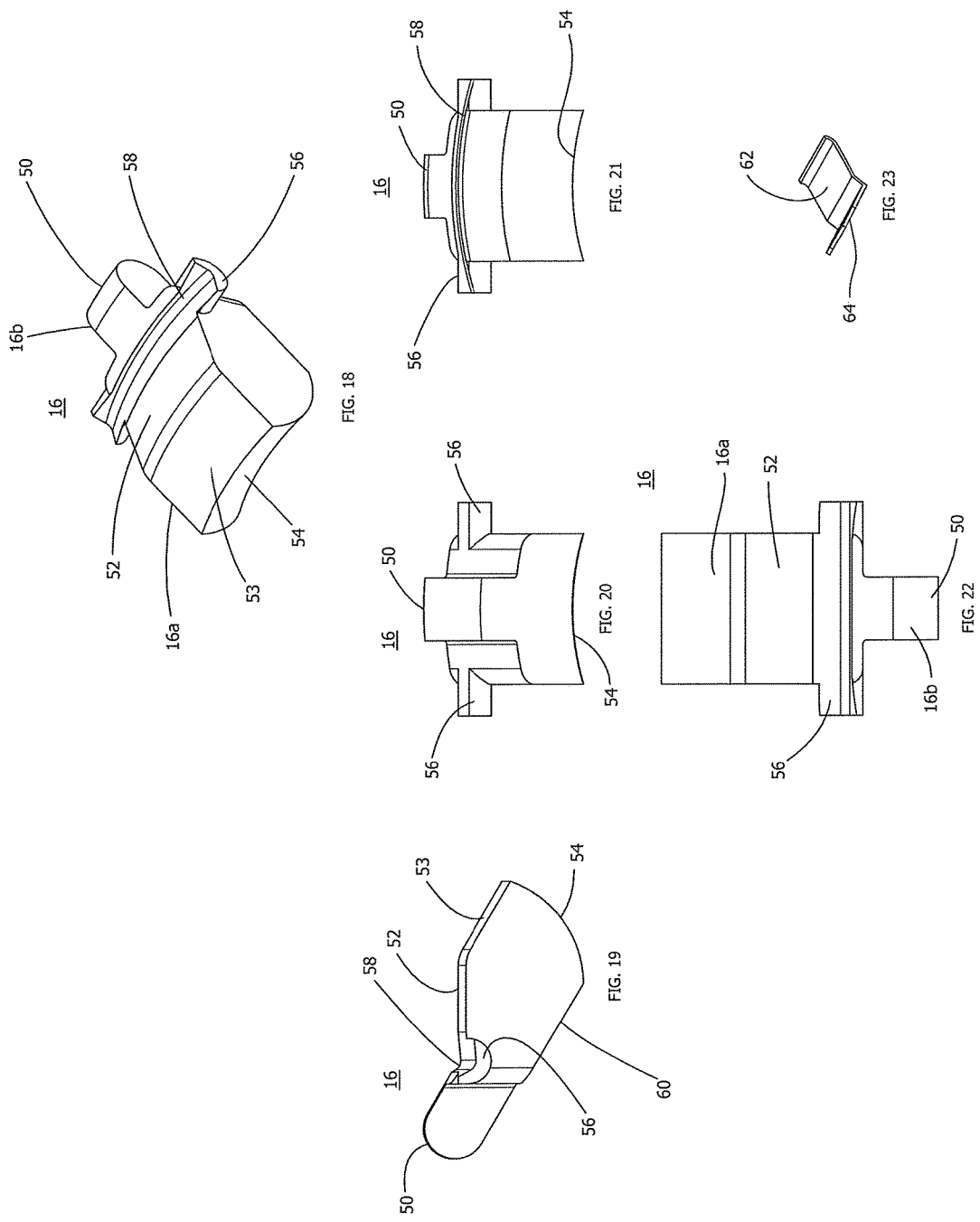

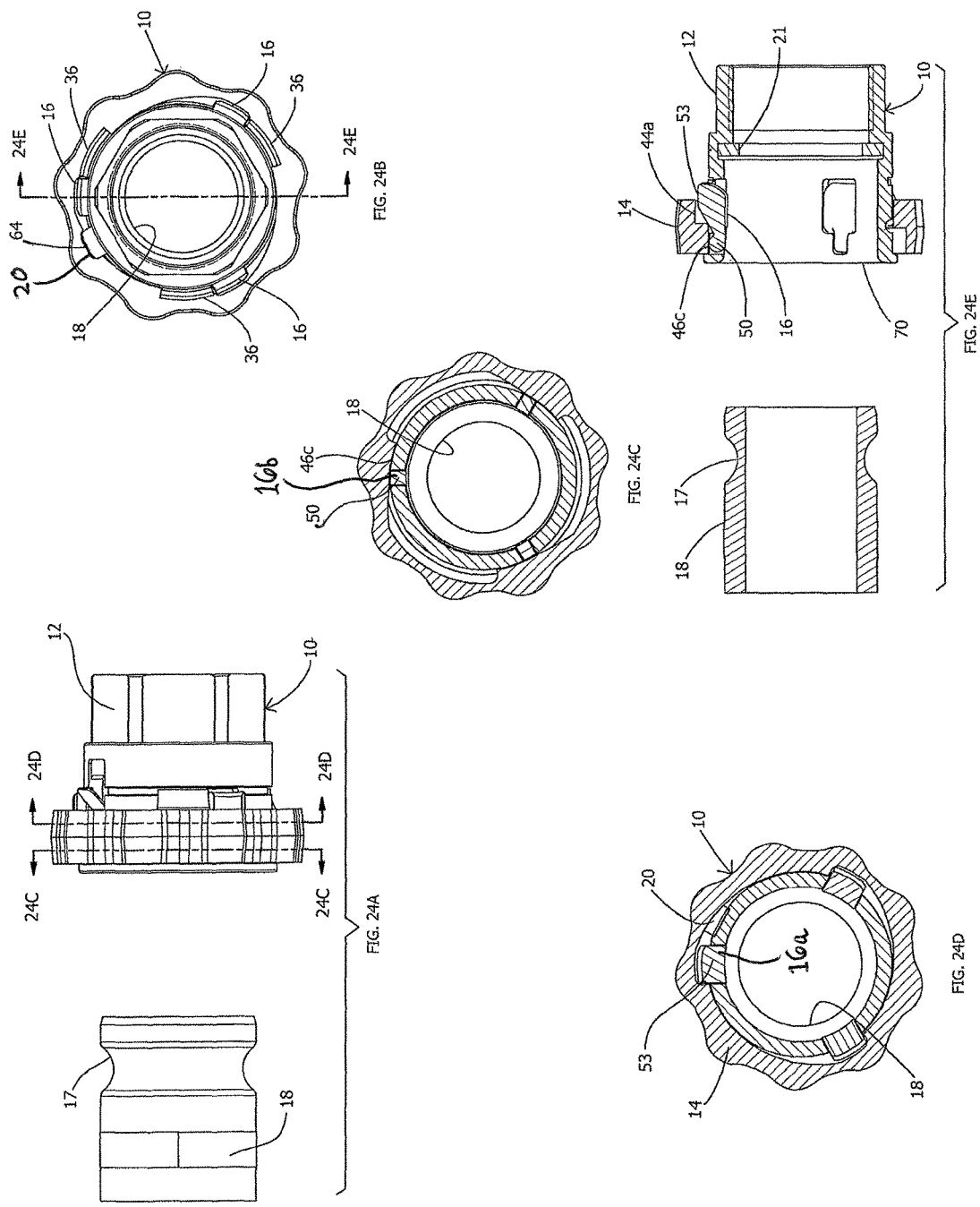

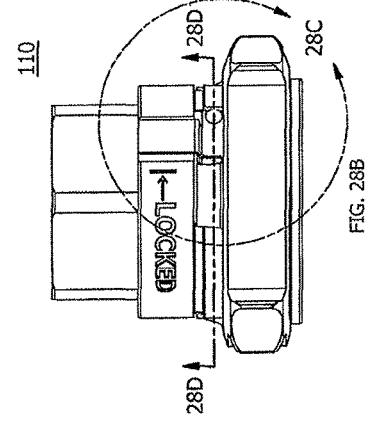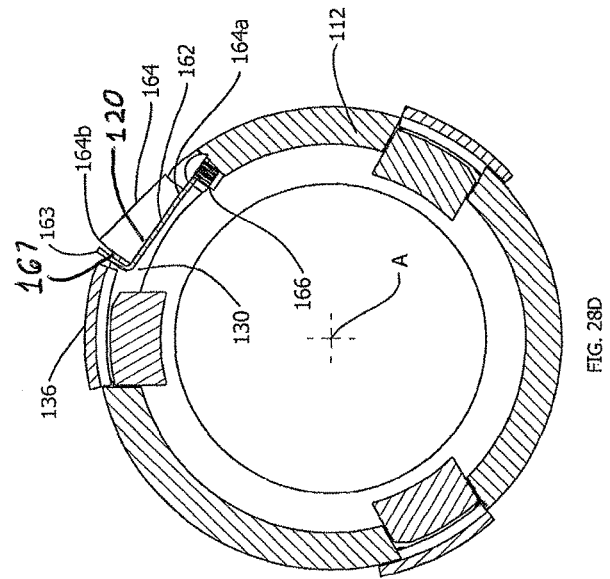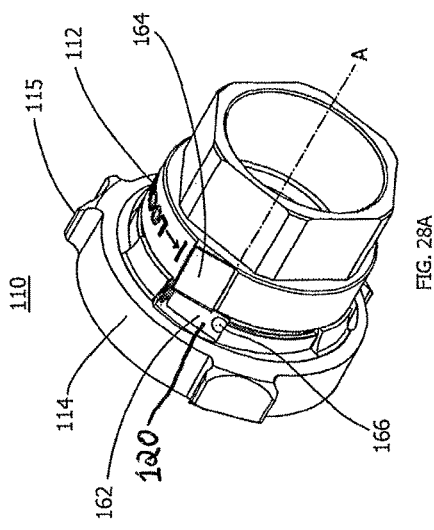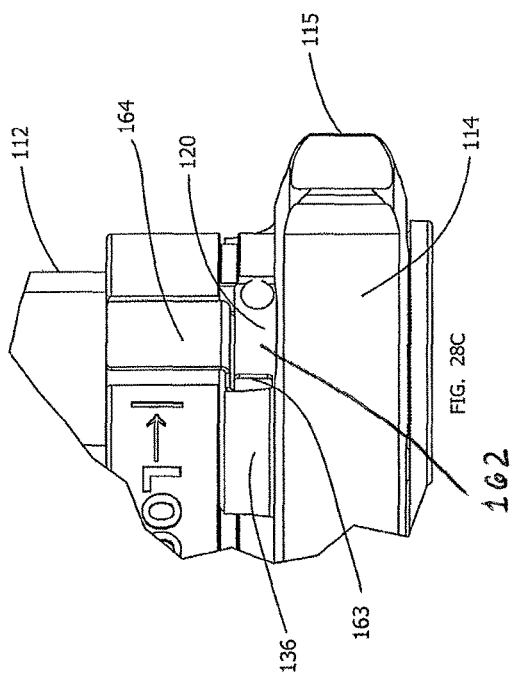

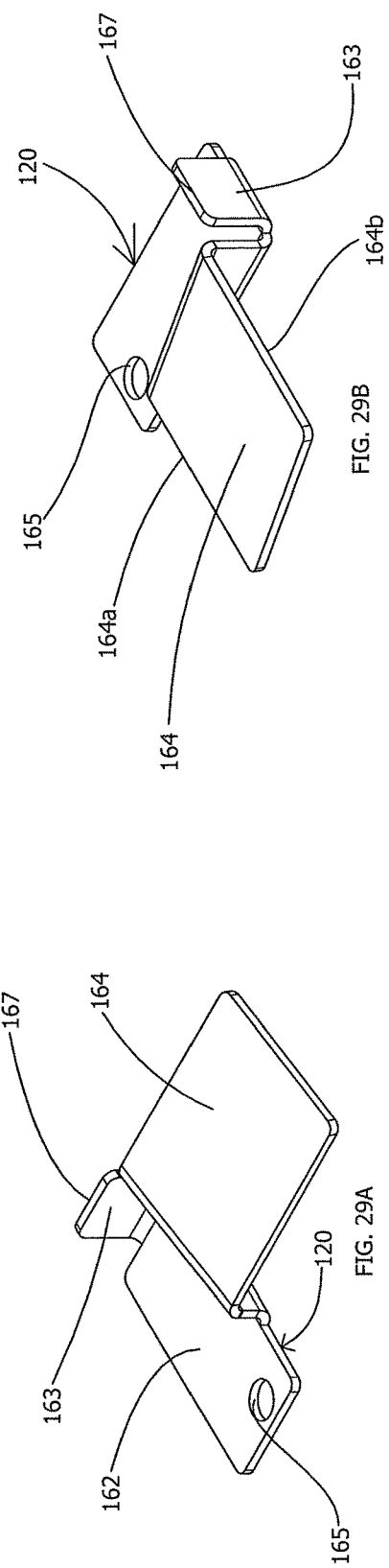

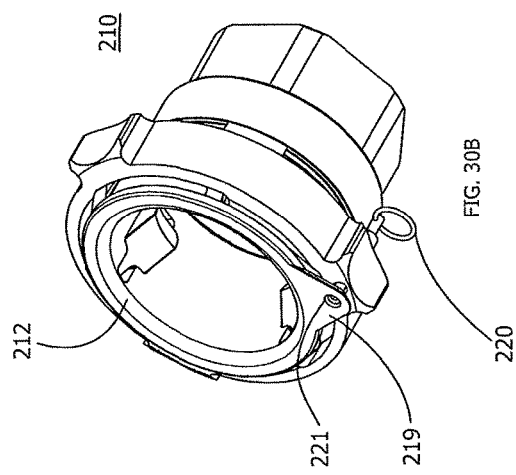
FIG. 30B
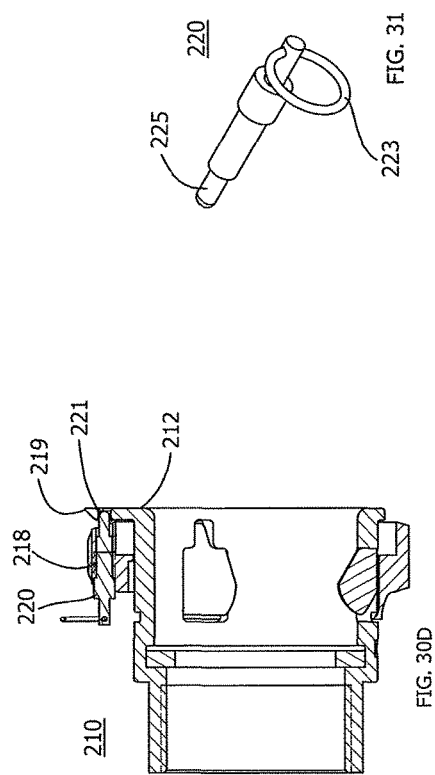
FIG. 31
FIG. 30D
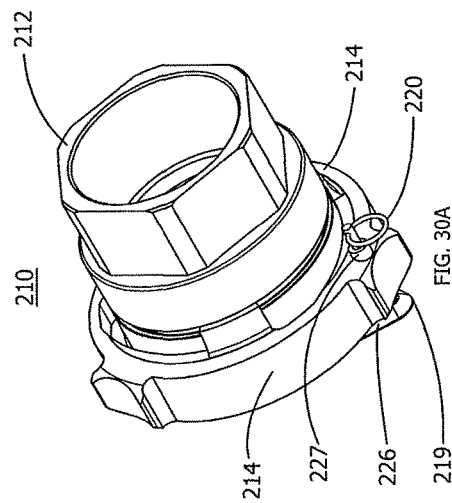
FIG. 30A
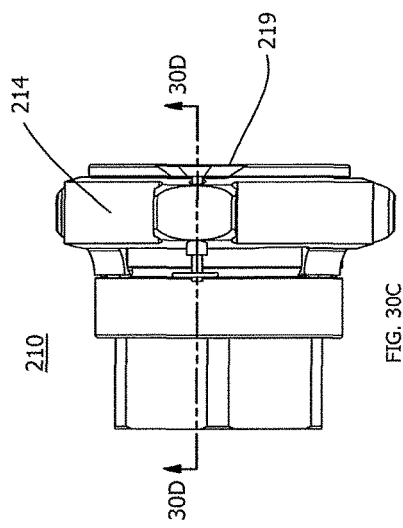
FIG. 30C

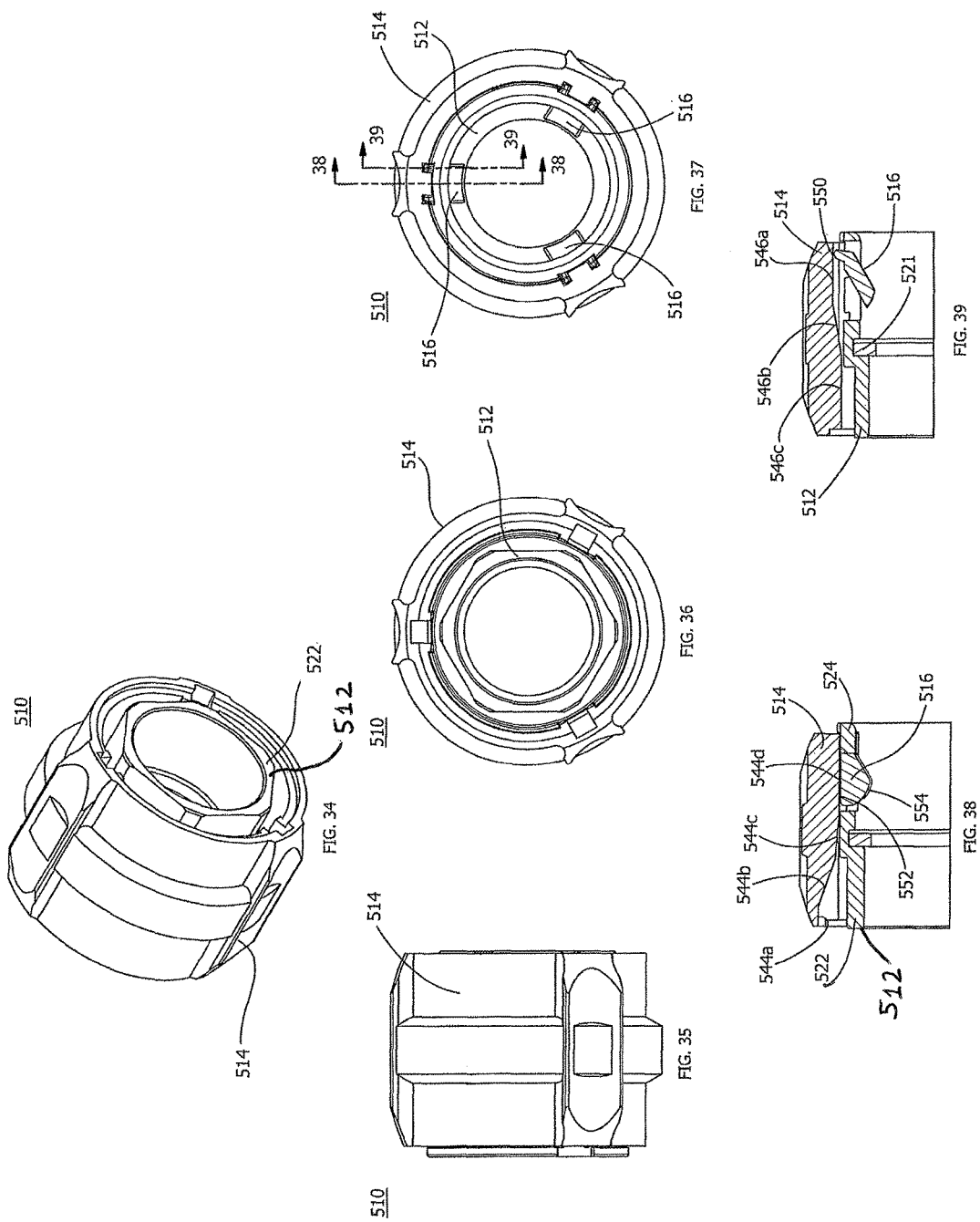

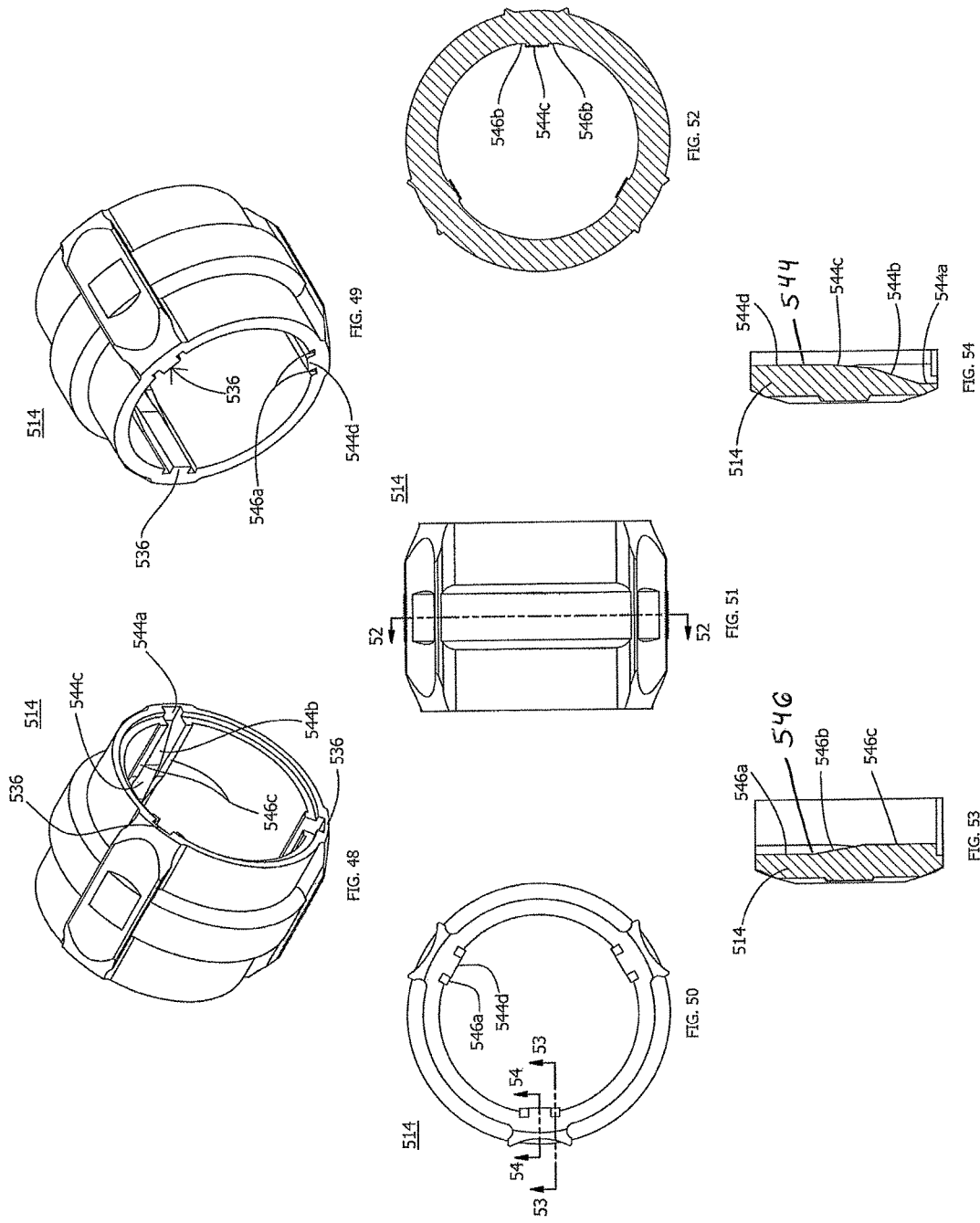

QUICK DISCONNECT COUPLING FOR CONDUIT

FIELD OF THE INVENTION

This invention relates to a quick disconnect coupling for a conduit.

BACKGROUND OF THE INVENTION

Quick action couplings have been in use for many years for the purpose of interconnecting pipes, hoses and other conduits used for the purpose of conveying liquids and dry bulk products under low to medium pressures. Improvements to quick action couplings are continually sought in the interests of performance, convenience and manufacturability.

SUMMARY OF THE INVENTION

According to one aspect of the invention, a coupling comprises a housing including a wall defining an interior space and extending along a central longitudinal axis. At least one opening is disposed in the wall. A ring is movably mounted about an exterior surface of the wall. At least one moveable member is at least partially positioned through the opening and is movably mounted between the ring and the wall of the housing. The moveable member has an engagement surface for engaging with a mating adapter that is positionable within the interior space of the housing. At least one engaging ramp is defined on the ring for moving the engagement surface of the moveable member toward the central longitudinal axis upon moving the ring in one direction in order to engage the coupling to the adapter. At least one releasing ramp is defined on the ring for moving the engagement surface of the moveable member away from the central longitudinal axis upon moving the ring in an opposite direction in order to disengage the coupling from the adapter.

According to another aspect of the invention, a coupling includes a housing including a wall defining an interior space and extending along a central longitudinal axis. A ring is movably mounted with respect to the wall. At least one moveable member has an engagement surface for engaging with an adapter that is positionable within the interior space of the housing. One or more ramps are defined on the ring for (i) moving the engagement surface of the moveable member toward the central longitudinal axis upon moving the ring in one direction in order to engage the coupling to the adapter, and (ii) moving the engagement surface of the moveable member away from the central longitudinal axis upon moving the ring in an opposite direction in order to disengage the coupling from the adapter.

According to yet another aspect of the invention, a coupling includes a housing having a wall defining an interior space and extending along a central longitudinal axis. A ring is movably mounted with respect to the wall. At least one moveable member has a rounded engagement surface for engaging and establishing three-dimensional surface contact with a rounded surface of an adapter that is positionable within the interior space of the housing. One or more ramps are defined on the ring for (i) moving the rounded engagement surface of the moveable member toward the central longitudinal axis upon moving the ring in one direction in order to engage the coupling to the adapter, and (ii) moving the rounded engagement surface of the moveable member away from the central longitudinal axis upon moving the ring in an opposite direction in order to disengage the coupling from the adapter.

BRIEF DESCRIPTION OF THE DRAWING FIGURES

FIG. 1 depicts a rear isometric view of a quick action coupling according to one exemplary embodiment of the invention.

FIG. 2 is a side elevation view of the quick action coupling of FIG. 1.

FIGS. 3 and 4 are rear and front elevation views, respectively, of the quick action coupling of FIG. 1.

FIG. 5 is a cross-sectional view of the coupling of FIG. 4 taken along the lines 5-5.

FIGS. 6 and 7 and rear and front isometric views, respectively, of a housing of the quick action coupling of FIG. 1.

FIG. 8 is a side elevation view of the housing of FIG. 6.

FIGS. 9 and 10 are rear and front elevation views, respectively, of the housing of FIG. 6.

FIG. 11 is a cross-sectional view of the housing of FIG. 10 taken along the lines 11-11.

FIGS. 12 and 13 are rear and front isometric views, respectively, of a ring of the quick action coupling of FIG. 1.

FIG. 14 is a side elevation view of the ring of FIG. 12.

FIGS. 15, 16 and 17 are cross-sectional views of the ring of FIG. 14 taken along the lines 15-15, 16-16 and 17-17, respectively.

FIG. 18 is a top-side isometric view of a moveable member of the quick action coupling of FIG. 1.

FIG. 19 is a side elevation view of the moveable member of FIG. 18.

FIGS. 20, 21 and 22 are rear elevation, front elevation and top plan views, respectively, of the moveable member of FIG. 18.

FIG. 23 is an isometric view of a locking tab of the quick action coupling of FIG. 1.

FIGS. 24A and 24B are side elevation and rear elevation views, respectively, of an adapter shown disassembled from the quick action coupling of FIG. 1, wherein the quick action coupling is maintained in a disengaged state.

FIGS. 24C and 24D are cross-sectional views of the decoupled assembly of FIG. 24A taken along the lines 24C-24C and 24D-24D, respectively.

FIG. 24E is a cross-sectional view of the decoupled assembly of FIG. 24B taken along the lines 24E-24E.

Figure 25C:
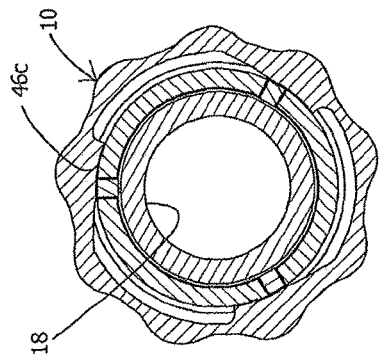
Figure 25B:
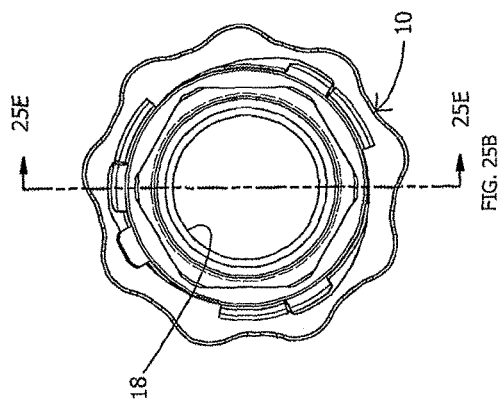
Figure 25E:
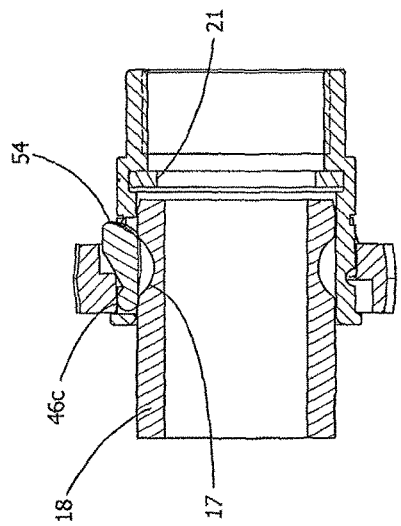
Figure 25A:
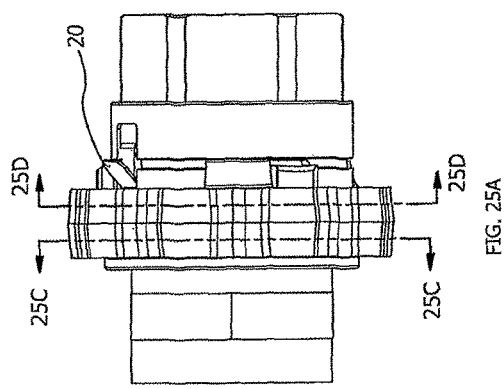

FIGS. 25A and 25B are side elevation and rear elevation views, respectively, of the adapter shown assembled onto the quick action coupling of FIG. 1, wherein the quick action coupling is shown in a disengaged state.

Figure 25D:
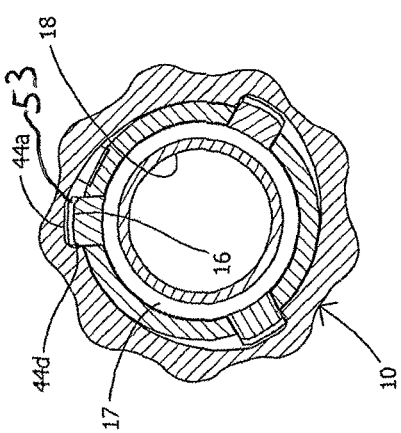

FIGS. 25C and 25D are a cross-sectional views of the coupled assembly of FIG. 25A taken along the lines 25C-25C and 25D-25D, respectively.

FIG. 25E is a cross-sectional view of the coupled assembly of FIG. 25B taken along the lines 25E-25E.

Figure 26C:
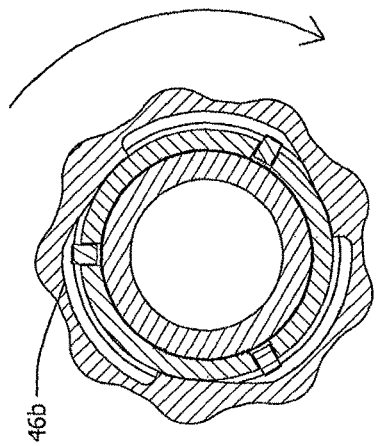
Figure 26B:
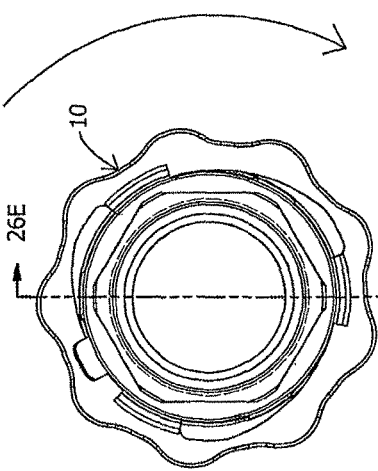
Figure 26A:
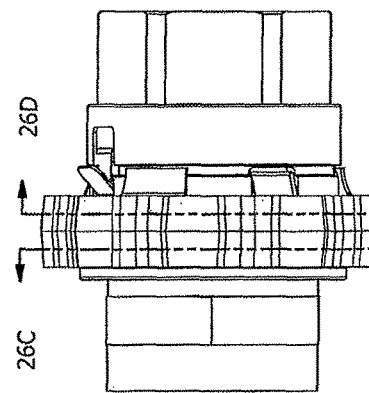

FIGS. 26A and 26B are side elevation and rear elevation views, respectively, of the adapter shown assembled onto the quick action coupling of FIG. 1, wherein the quick action coupling is maintained in an engaged state.

Figure 26E:
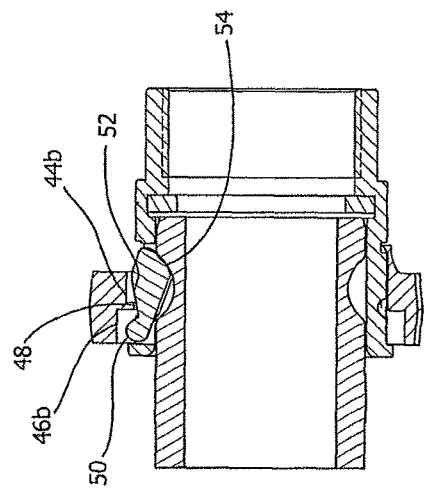
Figure 26D:
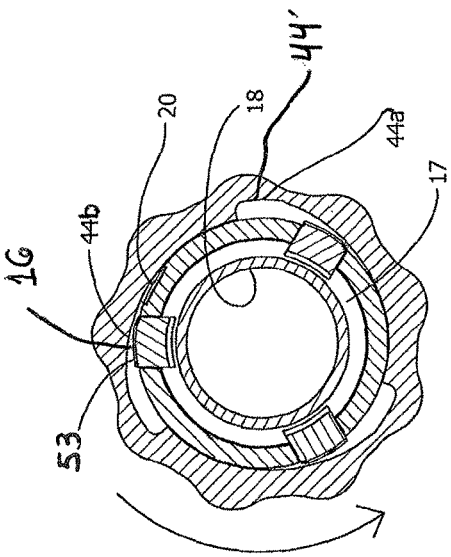

FIGS. 26C and 26D are cross-sectional views of the assembly of FIG. 26A taken along the lines 26C-26C and 26D-26D, respectively.

FIG. 26E is a cross-sectional view of the assembly of FIG. 26B taken along the lines 26E-26E.

Figure 27C:
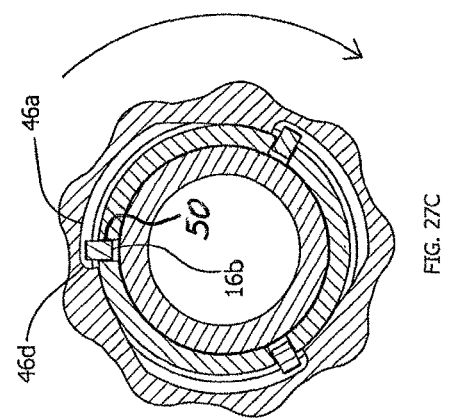
Figure 27B:
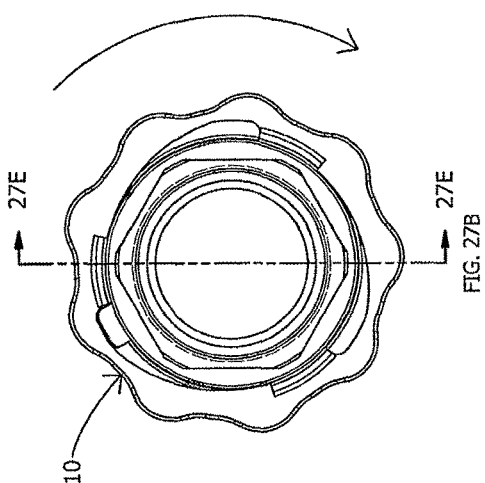
Figure 27A:
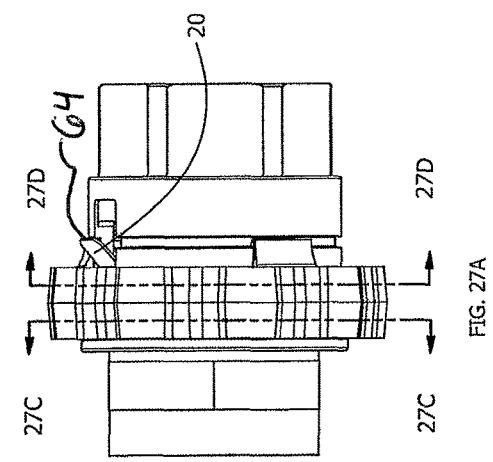

FIGS. 27A and 27B are side elevation and rear elevation views, respectively, of the adapter shown assembled onto the quick action coupling of FIG. 1, wherein the quick action coupling is maintained in a locked state.

Figure 27E:
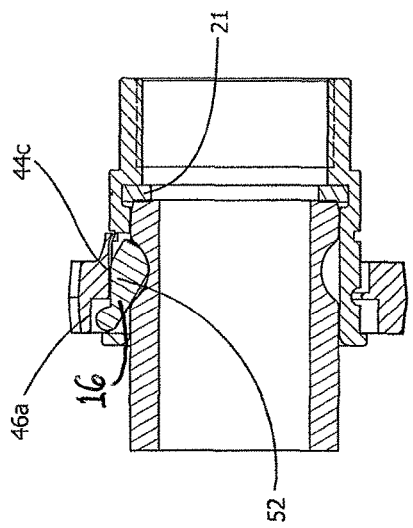
Figure 27D:
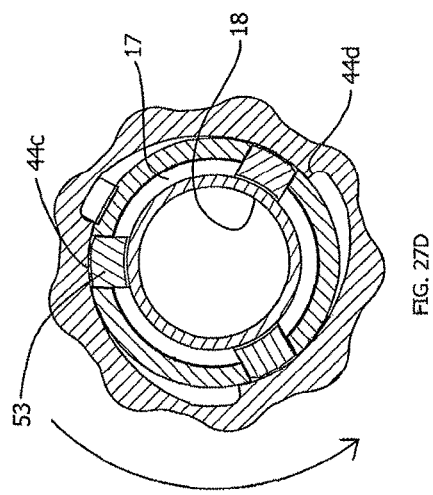

FIGS. 27C and 27D are cross-sectional views of the assembly of FIG. 27A taken along the lines 27C-27C and 27D-27D, respectively.

FIG. 27E is a cross-sectional view of the assembly of FIG. 27B taken along the lines 27E-27E.

FIG. 28A is a rear isometric view of a quick action coupling according to a second exemplary embodiment of the invention.

FIG. 28B is a side elevation view of the coupling of FIG. 28A.

FIG. 28C is a detailed view of the coupling of FIG. 28B taken along the circle '28C'.

FIG. 28D is a cross-sectional view of the coupling of FIG. 28B taken along the lines 28D-28D.

FIGS. 29A and 29B are isometric views of the locking tab of the coupling of FIG. 28A.

FIG. 29C is a side elevation view of the locking tab of FIG. 29A.

FIGS. 30A and 30B are rear and front isometric views, respectively, of a quick action coupling according to a third exemplary embodiment of the invention.

FIG. 30C is a side elevation view of the coupling of FIG. 30A.

FIG. 30D is a cross-sectional view of the coupling of FIG. 30C taken along the lines 30D-30D.

FIG. 31 is an isometric view of the locking tab of the coupling of FIG. 30A.

Figure 32D:
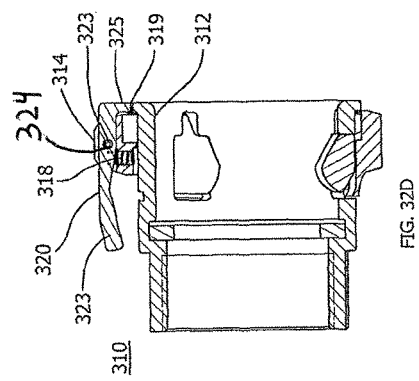
Figure 32A:
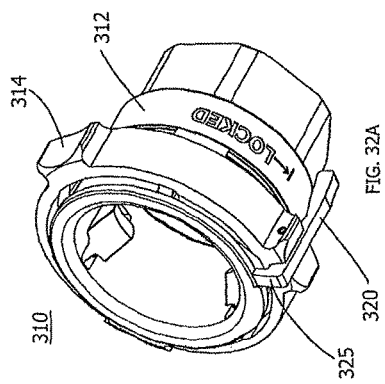

FIG. 32A is a front isometric view of a quick action coupling according to a fourth exemplary embodiment of the invention.

Figure 32C:
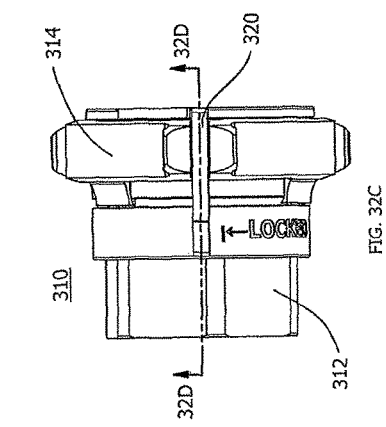
Figure 32B:
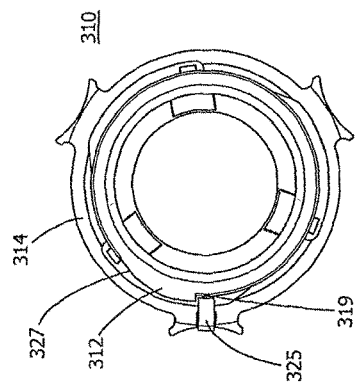

FIG. 32B is a front elevation view of the coupling of FIG. 32A.

FIG. 32C is a side elevation view of the coupling of FIG. 32A.

FIG. 32D is a cross-sectional view of the coupling of FIG. 32C taken along the lines 32D-32D.

Figure 33:
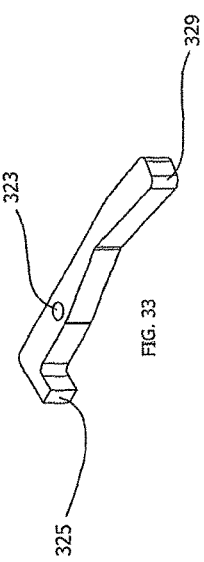

FIG. 33 is an isometric view of the locking lever of the coupling of FIG. 32A.

FIG. 34 depicts a rear isometric view of a quick action coupling according to a fifth exemplary embodiment of the invention, wherein the coupling is shown in an engaged state.

FIG. 35 is a side elevation view of the quick action coupling of FIG. 34.

FIGS. 36 and 37 are rear and front elevation views, respectively, of the quick action coupling of FIG. 34.

FIG. 38 is a cross-sectional view of the coupling of FIG. 37 taken along the lines 38-38.

FIG. 39 is a cross-sectional view of the coupling of FIG. 37 taken along the lines 39-39.

Figure 40:
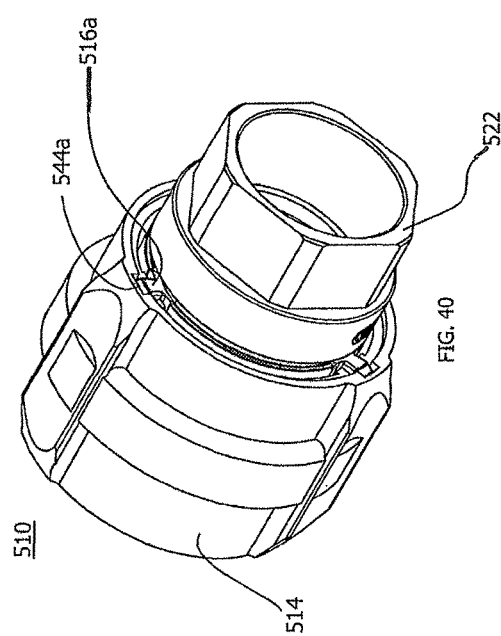

FIG. 40 depicts a rear isometric view of the quick action coupling of FIG. 34 shown in a disengaged state.

Figure 42:
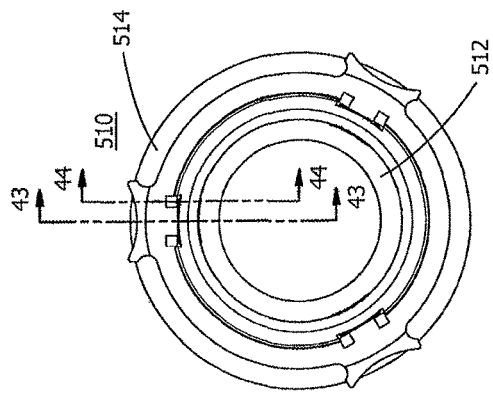
Figure 41:
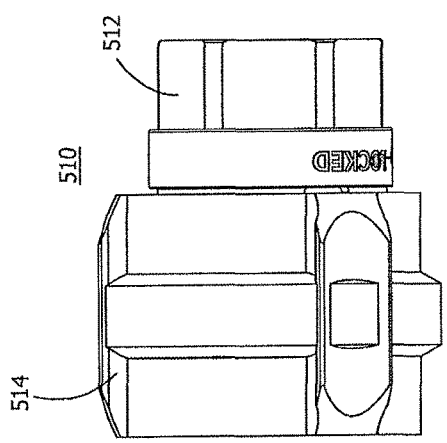

FIGS. 41 and 42 are side and front elevation views, respectively, of the quick action coupling of FIG. 34.

Figure 43:
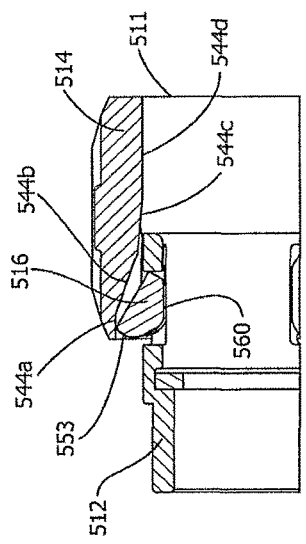

FIG. 43 is a cross-sectional view of the coupling of FIG. 42 taken along the lines 43-43.

Figure 44:
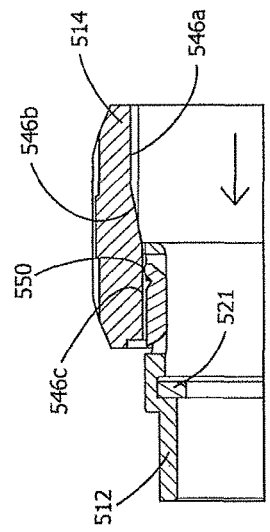

FIG. 44 is a cross-sectional view of the coupling of FIG. 42 taken along the lines 43-43.

Figure 46:
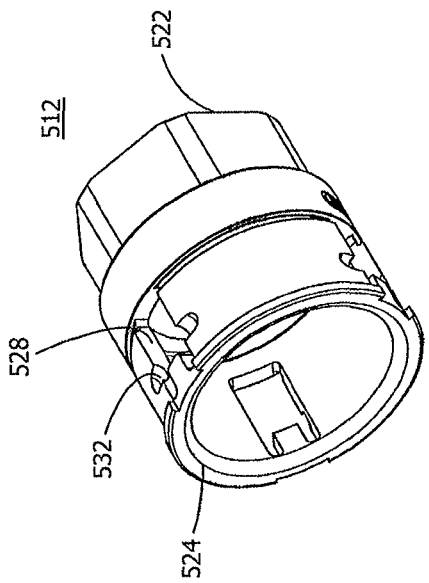
Figure 45:
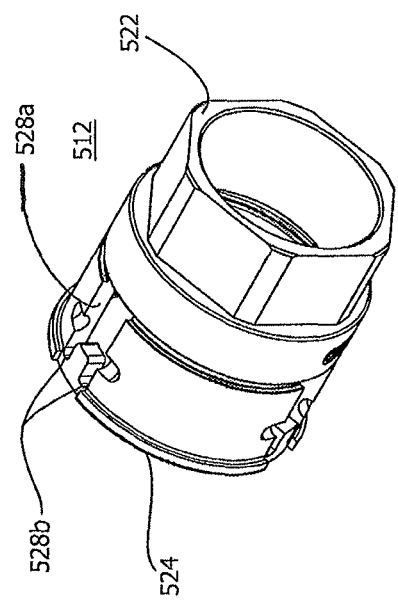

FIGS. 45 and 46 are rear and front isometric views, respectively, of a housing of the quick action coupling of FIG. 34.

Figure 47:
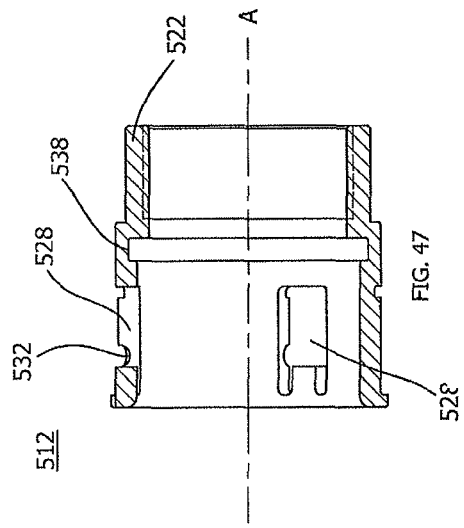

FIG. 47 is a cross-sectional view of the housing of FIG. 45.

FIGS. 48 and 49 are rear and front isometric views, respectively, of a ring of the quick action coupling of FIG. 34.

FIGS. 50 and 51 are front and side elevation views, respectively, of the ring of FIG. 48.

FIG. 52 is a cross-sectional view of the ring of FIG. 51 taken along the lines 52-52.

FIGS. 53 and 54 are cross-sectional views of the ring of FIG. 50 taken along the lines 53-53, and 54-54, respectively.

Figure 55:
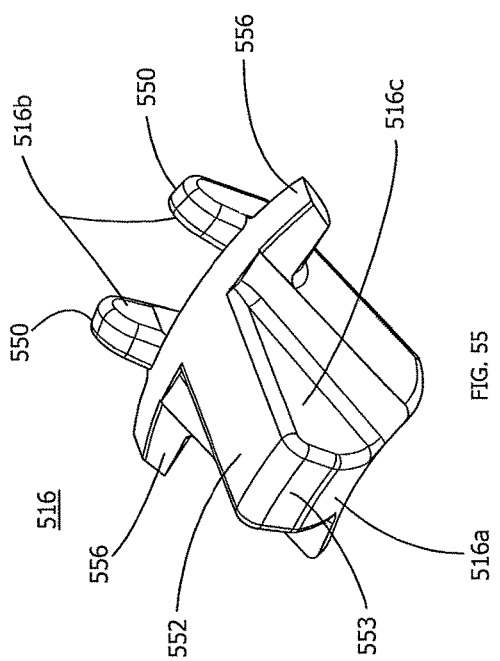

FIG. 55 is a top-side isometric view of a moveable member of the quick action coupling of FIG. 34.

Figure 56:
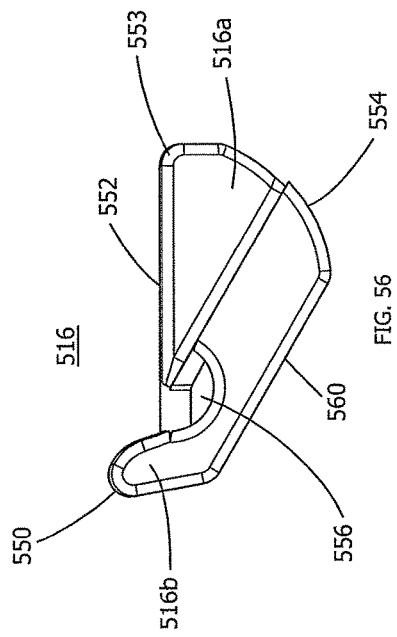

FIG. 56 is a side elevation view of the moveable member of FIG. 55.

Figure 57:
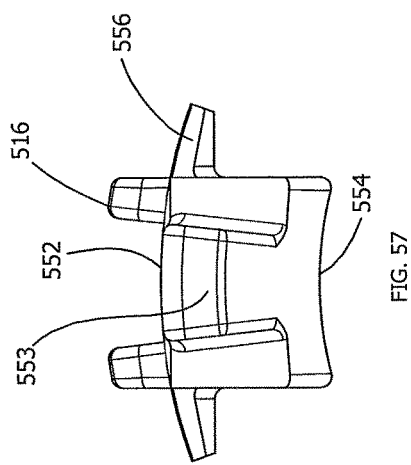

FIG. 57 is a front elevation view of the moveable member of FIG. 55.

DETAILED DESCRIPTION OF THE INVENTION

Various couplings are described hereinafter. The couplings may be used to convey and distribute fuel, water, food, chemicals, dry bulk product, and various gases, for example.

Unless noted otherwise, the individual components and features of the quick-action coupling 10 (coupling 10, hereinafter) are substantially cylindrical and are revolved about a central longitudinal axis A. Also, as used herein, the term "proximal" refers to either a location or a direction towards an end 22 of the coupling 10, and the term "distal" refers to either a location or a direction away from the end 22 of the coupling 10.

FIGS. 1-5 depict a quick action coupling 10 according to one exemplary embodiment of the invention. The coupling 10 generally comprises a hollow cylindrical housing 12; a ring 14 mounted to the exterior of the housing 12; three moveable members 16 that are mounted beneath the ring 14 for interacting with a recess 17 formed in a mating adapter 18 (see FIG. 24A); a seal 21 that is positioned within the interior of the housing 12 for abutting a proximal end of the adapter 18; and, a locking tab 20 that is configured for preventing inadvertent unlocking of the coupling 10.

Referring now to the individual components of the coupling 10, FIGS. 6-11 depict various views of the housing 12. The housing 12 includes a wall having a hollow cylindrical shape extending between the proximal end 22 and a distal end 24 along a central longitudinal axis 'A.' A fluid passageway is defined in the hollow region of the housing 12 between the proximal end 22 and the distal end 24. Although the housing 12 is shown cylindrical, it may have another cross-section shape.

An opening is provided at the distal end 24 of the housing 12 for receiving the adapter 18. An outwardly extending flange 19 is positioned at the distal end 24.

The inner surface of the proximal end 22 of the housing 12 includes female mechanical threads 25 for attaching to a fluid carrying conduit (not shown). The conduit may be a tube, pipe or hose, for example. The outer surface of the proximal end 22 includes a surface 26 for interfacing with a wrench for example to couple and decouple the housing 12 to the aforementioned fluid carrying conduit. The surface 26 includes two or more flats for accommodating a wrench. Although not shown, in an alternative embodiment, the female mechanical threads 25 are omitted and the hexagonal surface 26 is replaced with male mechanical threads, a barb or any other type of releasable connection means that is known to those skilled in the art.

A series of three openings 28 are provided through the wall of the housing 12. The openings 28 are evenly spaced apart about the circumference of the housing 12 by about 120 degrees. The openings 28 are structurally equivalent and are positioned an equal distance from the proximal end 22. In this embodiment, each opening 28 includes a large rectangular window 28a and a smaller rectangular recess 28b that extends in a distal direction from the rectangular window 28a. In an assembled form of the coupling 10, each opening 28 is configured to interact with one of the moveable members 16.

The openings 28 may vary from that which is shown and described. For example, the size and shape of each opening 28 corresponds to the profile of the perimeter of the moveable member 16 interacting therewith, and could vary depending upon the geometry of the moveable members 16. The number of openings 28 and corresponding moveable members 16 may vary. Accordingly, the exact angle separating the adjacent openings 28 can vary depending upon the number of moveable members 16 employed. Also, the openings 28 may be either evenly or unevenly spaced about the circumference of the housing 12.

A single rectangular counterbored recess 30 is also positioned through the wall thickness of the housing 12 at a location adjacent to and proximal of one of the openings 28. In an assembled form of the coupling 10, the rectangular recess 30 is configured to accommodate the locking tab 20. Although the coupling 10 includes a single recess 30 and locking tab 20, the number of recesses 30 and corresponding locking tabs 20 may vary from that shown and described.

As best shown in FIG. 8, a recess 32 extends about the circumference of the exterior surface of the housing 12 at a location proximal to the flange 19. The recess 32 has a rounded concave shape. In an assembled form of the coupling 10, a pivot arm of each moveable member 16 is pivotally positioned in the recess 32. The recess 32 in which the pivot arms reside could be a continuous recess (as shown) or it could be extensions of the moveable member profile.

Another recess 34 extends about the circumference of the exterior surface of the housing 12 at a location proximal of the recess 32. The recess 34 has a square cross-section and includes two interior corners facing each other. In an assembled form of the coupling 10, the recess 34 interacts with tabs 36 on the ring 14 for mounting the ring 14 to the housing 12. The interface between the tabs 36 and the recess 34 permits rotation of the ring 14 about the axis 'A', yet prevents relative translation of the ring 14 and the housing 12 along axis 'A.' Once the ring 14 is mounted to the housing 12, the ring 14 can only be translated by elastically deforming the tabs 36. Although not shown, a separate retaining ring may be positioned in the recess 34 for retaining the ring 14 to the housing 12 either in lieu of or in addition to the tabs 36.

A recess 38 extends about the entire circumference of the interior surface of the housing 12 at a location proximal of the recess 34 and distal of the mechanical threads 25. The recess 38 is squared-off and includes two interior corners facing each other.

The annular seal 21 is positioned within the recess 38. The seal 21 may be a pressure sensitive seal, such as that disclosed in U.S. Pat. No. 5,779,277, which is incorporated by reference herein in its entirety for all purposes. Alternatively, the seal 21 may be a plain compressive seal.

The housing 12 may be composed of either metal or plastic, for example, and may also be formed by a molding operation, such as die casting, forging or injection molding.

FIGS. 12-17 depict the ring 14 of the coupling 10. Ring 14 includes a substantially tubular or annular body in cross-section. Although the term 'ring' is used throughout, the interior and exterior surfaces of each ring described herein are not necessarily smooth, and may or may not include protrusions. For example, the exterior surface 42 of the ring 14 is specially contoured to facilitate grasping and turning by a user. According to this example, the exterior surface 42 undulates between peaks and valleys for grasping of the ring 14 by the user. The exterior surface 42 may also be knurled, for example, to facilitate gripping.

Three tabs 36 extend from the proximal end of the ring 14. The tabs 36 are structurally and functionally equivalent. Each tab 36 has a substantially rectangular shape, and the free proximal end 37 of each tab 36 extends radially inward beyond the smallest inner diameter of the ring 14, as best shown in FIG. 5. The free proximal end 37 of each tab 36 has a thickness that can fit within the width of the recess 34 of the housing 12. The tabs 36 are evenly spaced apart about the circumference of the ring 14 by about 120 degrees. The tabs 36 are formed from a resilient material so that they flex as the ring 14 is mounted over the exterior surface of the housing 12 and snap into the recess 34. The number, size and shape of the tabs 36 may vary from that which is shown and described. Alternatively, the tabs 36 may be omitted in favor of a snap ring (not shown) or other similar retaining device familiar to those skilled in the art.

As best shown in FIG. 15, the interior surface of the ring 14 includes various surfaces for interacting with the moveable members 16 to accomplish pivoting of the moveable members 16 between disengaged and engaged positions. More particularly, a series of three engaging ramps 44, 44' and 44" (referred to either individually or collectively as ramp(s) 44) are defined on the proximal portion of the interior of the ring 14. Each ramp 44 is assigned to a single moveable member 16. As will be described in greater detail later, the ramps 44 are configured to engage the moveable members 16 into the recess 17 of the adapter 18.

The engaging ramps 44, which are structurally and functional equivalent, are uniformly spaced apart by 120 degrees about the central longitudinal axis 'A.' It should be understood that the number and spacing (i.e., even or uneven) of the engaging ramps 44 may vary. Each engaging ramp 44 includes a first portion 44a, a second portion 44b, a third portion 44c, and a fourth portion 44d. The portions 44a-44d intersect one another, as shown.

The first portion 44a is substantially flat (i.e., constant) in a circumferential direction and is positioned furthest from the central longitudinal axis 'A.' The first portion 44a has a constant radius about the longitudinal axis 'A.'

The second portion 44b is substantially rounded in a circumferential direction and is positioned closer to the central longitudinal axis 'A' than the first portion 44a. The second portion 44b has a constant radius whose center is offset from the longitudinal axis 'A.' The second portion 44b may be referred to as a rapid engaging section.

The third portion 44c is also substantially rounded in a circumferential direction and is positioned closest to the central longitudinal axis 'A' (as compared with the other portions 44a and 44b). The third portion 44c has a constant radius about the longitudinal axis 'A.'

The third portion 44c could be curved (as Shown) or substantially flat. The third portion 44c may be referred to as a mechanical advantage section.

The fourth portion 44d is substantially flat, extends in a radial direction toward the central longitudinal axis 'A,' and is substantially perpendicular to the first portion 44a. The fourth portion 44*d* connects the first portion 44*a* of one ramp 44 with the third portion 44*c* of an adjacent ramp 44.

As best shown in FIG. 16, a series of three releasing ramps 46, 46' and 46" (referred to either individually or collectively as ramp(s) 46) are defined on the distal portion of the interior of the ring 14. Each ramp 46 is assigned to a single moveable member 16. As will be described in greater detail later, the ramps 46 are configured to disengage the moveable members 16 from the recess 17 of the adapter 18.

The ramps 46, which are structurally and functional equivalent, are uniformly spaced apart by 120 degrees about the central longitudinal axis 'A.' Each ramp 46 includes a first portion 46*a*, a second portion 46*b*, a third portion 46*c*, and a fourth portion 46*d*. The portions 46*a*-46*d* intersect one another.

The first portion 46*a* is substantially rounded in a circumferential direction and is positioned furthest from the central longitudinal axis 'A.' The first portion 46*a* has a constant radius about the longitudinal axis 'A.'

The second portion 46*b* is substantially flat in a circumferential direction and is positioned closer to the central longitudinal axis 'A' than the first portion 46*a*. The second portion 46*b* has a constant radius whose center is offset from the longitudinal axis 'A.'

The third portion 46*c* is also substantially rounded in a circumferential direction and is positioned closest to the central longitudinal axis 'A' (as compared with the other portions 46*a* and 46*b*). The third portion 46*c* has a constant radius about the longitudinal axis 'A.' The fourth portion 46*d* is substantially flat, extends in a radial direction toward the central longitudinal axis 'A,' and is substantially perpendicular to the leading end of the first portion 46*a*.

The fourth portion 46*d* connects the first portion 46*a* of one ramp 46 with the third portion 46*c* of an adjacent ramp 46.

The number of ramps 44 and 46 may vary with the number of moveable members 16. A greater number of ramps 44 and 46 and moveable members 16, to a limited extent, would result in greater retention performance of the coupling, especially for a large diameter ring. The slope of each ramp 44 and 46, which determines the engagement speed and mechanical advantage applied to each moveable member 16, may vary. The ramps 44 and 46 are configured to accomplish locking of the moveable members 16 in only ⅓ turn of the ring 14 in one direction, and accomplish unlocking of the moveable members 16 in only ⅓ turn of the ring 14 in the opposite direction.

A pivot rib 48, which extends at least partially about the interior circumference of the ring 14, is defined axially between the ramps 44 and 46. The pivot rib 48 could be either continuous or interrupted about the interior circumference of the ring 14. In operation, the moveable members 16 are each configured to pivot about the pivot rib 48 between the engaged and disengaged positions. The pivot rib 48 could be integral with the ring 14 (as shown) or it could also be a separate component in the form of a snap ring (for example).

The ring 14 may be composed of any material, such as either metal or plastic, for example, and may also be formed by a molding operation, such as die casting or injection molding. Alternatively, the ring 14 may be composed of both metal and plastic comprising a metal insert and an overmolded plastic.

FIGS. 18-22 depict one moveable member 16 of the coupling 10. It should be understood that the other two moveable members 16 are structurally and functionally equivalent to the moveable member 16 shown in FIGS. 18-22.

The moveable member 16 includes a solid body including a large first end 16*a*, a smaller second end 16*b*, and at least one pivot arm 56 extending outwardly and positioned between the first end 16*a* and the second end 16*b*. The pivot arm 56 may be integral with the solid body, as shown, or it may be one or more separate pins inserted in the body of the moveable member 16.

In an assembled form of the coupling 10, the first end 16*a* pivots through one of the windows 28*a* of the housing 12, the second end 16*b* pivots through the recess 28*b* extending from the aforementioned window 28 of the housing 12, and the pivot arm 56 resides in the recess 32 of the housing 12. The recess 32 may alternatively constitute an extended portion of the window 28.

Each moveable member 16 includes multiple surfaces for interacting with one of the engaging ramps 44 and one of the releasing ramps 46 of the ring 14. A releasing surface 50 is defined at least partially on the top and rear sides of the second end 16*b* of the moveable member 16 for interacting with one of the releasing ramps 46. The releasing surface 50 is rounded.

A bearing surface 52 is defined on the top side of the first end 16*a* of the moveable member 16 for interacting with one of the engaging ramps 44. Another bearing surface 53, which is also defined on the top side of the first end 16*a* of the moveable member 16, is provided for interacting with one of the engaging ramps 44. An engagement surface 54 is defined on the front side of the first end 16*a* of the moveable member 16. The engagement surface 54 is sized for engaging the recess 17 formed in the mating adapter 18.

The recess 17 may be toroidal, as shown, or it may have any other complimentary geometric shape for interacting with the moveable member 16. Additionally, the recess 17 may extend either continuously or non-continuously about the outer circumference of the mating adapter 18.

As best shown in FIG. 21, the engagement surface 54 of the moveable member 16 is concave and rounded to complement the recess 17 of the mating adapter 18, such that a three-dimensional surface contact is established between the entire engagement surface 54 and the recess 17 of the mating adapter 18 in the engaged state. More particularly, the engagement surface 54 is curved in the X, Y and Z directions of an XYZ axis Cartesian coordinate system. The Z axis may be the longitudinal axis 'A' of the coupling 10. Stated differently, the curvature extends about the longitudinal axis 'A' of the coupling 10, and the curvature also extends in a plane that extends along the longitudinal axis 'A' of the coupling 10. The recess 17 is similarly curved in the X, Y and Z directions to conform to the curvature of the engagement surface 54, or vice versa. Thus, in the engaged state of the coupling 10, surface contact exists between the engagement surface 54 and the recess 17 in the X, Y and Z directions with respect to the longitudinal axis 'A' of the coupling 10.

In contrast, in a conventional coupling having a cylindrical engagement surface, a single point of contact may be established between the cylindrical engagement surface and the exterior of a mating adapter. The surface contact provided by the engagement surface 54 provides a more robust connection between the housing 12 and the mating adapter 18 than would be provided by the aforementioned conventional coupling.

More particularly, the surface contact between the moveable member 16 and the recess 17 has at least two advantages, namely, (i) increased retention force between the moveable member 16 and the recess 17, and (ii) reduced tendency of the coupling components to deform under load. Deformation upon loading is what makes conventional moveable members/adapters difficult to disengage, and can cause permanent deformation of the moveable members/adapters.

A pivot arm 56 extends from both the left and right sides of the body at the intersection of the engaging surface 52 and the releasing surface 50. A pivot relief 58, in the form of a rounded depression, is defined on the top end of the pivot arm 56. In an assembled form of the coupling 10, the pivot rib 48 of the ring 14 is positioned in the pivot relief 58 of the moveable member 16 such that the pivot arm 56 is capable of pivoting on the pivot rib 48 of the ring 14 between the engaged and disengaged positions. The pivot arm 56, the engaging surface 52 and the bearing surface 53 are convex (i.e., bowed outwardly) to match the circular shape of the surfaces of the ring 14 which they contact. The bottom end of the moveable member 16 includes a rounded surface 60, having a radius that substantially matches the outer diameter of the adapter 18, that is configured to permit the passage and release of the mating adapter 18 into and out of the housing 12 when the moveable member 16 is pivoted to the disengaged position (see FIGS. 24E and 25E). The rounded surface 60 is contoured to sit flush with the inner surface of the housing 12 when the moveable member 16 is pivoted to the disengaged position.

Each moveable member 16 may be composed of either metal or plastic, for example, and may also be formed by a molding operation, such as die casting, forging or injection molding.

FIG. 23 depicts the flexible locking tab 20 of the coupling 10. The locking tab 20 includes a flat rectangular portion 62 and an angled rectangular portion 64 extending from the flat rectangular portion 62 by an acute angle. In an assembled form of the coupling, the flat rectangular portion 62 is positioned in the counterbored recess 30 of the housing 12 beneath the ring 14, and the angled rectangular portion 64 extends outwardly away from the exterior surface of the housing 12 and the ring 14 (see FIG. 2). The locking tab 20 is configured to interact with one of the tabs 36 of the ring 14 to prevent inadvertent rotation of the ring 14 from a locked position without deliberate manual user intervention, as will be described later.

The flexible locking tab 20 maintains the coupling 10 in a locked state and prevents the inadvertent movement of the coupling 10 from the locked state to a disengaged state. In operation, to move the coupling 10 from the locked state to the disengaged state, the angled rectangular portion 64 must be manually flexed downward toward the longitudinal axis A, and the ring 14 can then be rotated in a counterclockwise direction such that the tab 36 of the ring 14 passes over the depressed angled rectangular portion 64. Once the tab 36 of the ring 14 is rotated beyond the tab 20, the angled rectangular portion 64 springs outwardly and returns to its original position shown in FIG. 2.

The locking tab 20 may be mounted to the housing 12 by a rivet, fastener, or weld, for example. The number of locking tabs 20 may vary from that which is shown and described. The locking tab may be composed of either metal or plastic, for example, and may be formed by a stamping operation or a molding operation, such as die casting, extruding or injection molding. It is envisioned that the locking tab could be replaced by a locking tab on the ring 14 that interacts with a recess formed on the exterior of the housing 12.

Referring now to the operation of the coupling 10 shown in FIGS. 24A-27E, the coupling 10 is initially maintained in the decoupled state depicted in FIGS. 24A-24E. In the decoupled state, the adapter 18 is decoupled from the coupling 10, and the coupling 10 is maintained in a disengaged state ready to receive the adapter 18.

In the disengaged state of the coupling 10, the surface 46c of each releasing ramp 46 of the ring 14 bears on the releasing surface 50 of a respective moveable member 16, and the surface 44a of each engaging ramp 44 bears on the surface 53 of the moveable member 16. Accordingly, each moveable member 16 is pivoted to a rotational position wherein the surface 60 of the moveable member 16 is flush with the interior surface of the housing 12 and the coupling 10 is ready to receive the adapter 18.

As shown in FIGS. 25A-25E, the adapter 18 is then inserted through the opening 70 at the distal end of the coupling 10 and translated in the distal direction through the interior of the coupling 10 until the distal end of the adapter 18 approaches and lightly contacts the seal 21. The coupling 10 is still maintained in the disengaged state.

The coupling 10 is then moved from the disengaged state of FIGS. 25A-25E toward the engaged state of FIGS. 26A-26E. More particularly, the ring 14 is rotated in the clockwise rotational direction depicted by the arrows in FIGS. 26B-26D. As the ring 14 is rotated in the clockwise direction shown, the surface 44b of each engaging ramp 44 gradually contacts the surfaces 52 and 53 of its respective moveable member 16 and consequently pivots the moveable member 16 about its pivot arm 56 causing the engagement surface 54 of the moveable member 16 to move into the recess 17 of the adapter 18. At the same time, the surface 46b of each releasing ramp 46 gradually separates from the releasing surface 50 of its respective moveable member 16 to permit the aforementioned pivoting action of the moveable member 16. It should be understood that the ring 14 cannot be rotated in the counterclockwise rotational direction from the disengaged position shown in FIGS. 25A-25E because the surface 44d of each ramp 44 would bear on the first end 16a of its respective moveable member 16.

The coupling 10 is continued to be moved from the partially engaged and not yet sealed state of FIGS. 26A-26E toward the sealed, engaged and locked state of FIGS. 27A-27E. The ring 14 is continued to be rotated in the clockwise rotational direction as one of the tabs 36 of the ring 14 passes over top of, and thereby consequently depresses, the locking tab 20.

Referring still to FIGS. 27A-27E, as the ring 14 is rotated further in the clockwise rotational direction and one of the tabs 36 of the ring 14 passes over top of the depressed locking tab 20, the surface 44c of each engaging ramp 44 gradually contacts the surface 52 of its respective moveable member 16 and further pivots the moveable member 16 its pivot arm 56 causing the engagement surface 54 of the moveable member 16 to move further into the recess 17 of the adapter 18. Once the tab 36 of the ring 14 completely passes over top of the depressed locking tab 20, the angled portion 64 of the locking tab 20 springs back to its initial position shown in FIG. 25A. At the same time, the surface 46a of each releasing ramp 46 further separates from the releasing surface 50 of its respective moveable member 16 to permit the aforementioned pivoting action of the moveable member 16. As the engagement surface 54 of the moveable member 16 moves further into the recess 17 of the adapter 18, the adapter 18 is urged in the distal direction by at least 0.025 inches (by way of non-limiting example) until the distal end of the adapter 18 sufficiently compresses the seal 21, thereby resulting in a substantially fluid-tight seal at the interface between the seal 21 and the distal end of the adapter 18.

At this point, i.e., after a ⅓ revolution of the ring 14 in the clockwise direction, the adapter 18 is now engaged and locked to the coupling 10, and fluid may be delivered through the assembly of coupling 10 and adapter 18. In the locked state, the coupling 10 may handle fluid pressures of 5000 psi, by way of non-limiting example. Also, at this point, as shown in FIG. 27C, the ring 14 cannot be rotated further in the clockwise rotational direction because the surface 46d of each releasing ramp 46 bears on the second end 16b of its respective moveable member 16.

To decouple the adapter 18 from the coupling 10, the angled portion 64 of the locking tab 20 must first be manually depressed downward into the recess 30 of the housing 12. Starting from the position shown in FIGS. 27A-27E, the ring 14 is then rotated in the counterclockwise rotational direction toward the position shown in FIGS. 26A-26E, as one of the tabs 36 of the ring 14 passes over top of the depressed locking tab 20. Turning now to FIGS. 26A-26E, as the ring 14 is rotated in the counterclockwise direction, the surface 44b of each engaging ramp 44 gradually separates from the surfaces 52 and 53 of its respective moveable member 16 and the pivot arm 56 of the moveable member 16 consequently pivots the moveable member 16 in the opposite rotational direction causing the engagement surface 54 of the moveable member 16 to slowly withdrawal from the recess 17 of the adapter 18. At the same time, the surface 46b of each releasing ramp 46 gradually moves toward, but is not yet in contact with, the surface 50 of its respective moveable member 16. Once the tab 36 of the ring 14 completely passes over top of the depressed locking tab 20, the angled portion 64 of the locking tab 20 springs back to its initial position shown in FIG. 25A.

As the ring 14 is rotated further in the counterclockwise direction, the surface 46c of each releasing ramp 46 gradually contacts the surface 50 of its respective moveable member 16. Each moveable member 16 consequently pivots further about its pivot arm 56 of the ring 14 in the opposite rotational direction until the engagement surface 54 of the moveable member 16 is completely withdrawn from the recess 17 of the adapter 18. At this point, i.e., after a ⅓ revolution of the ring 14 in the counterclockwise direction, the coupling is in the disengaged state. As shown in FIG. 24D, it is not possible to rotate the ring 14 any further in the counterclockwise direction because the surface 44d of each ramp 44 bears on the first end 16a of its respective moveable member 16. The adapter 18 may then be translated away from the coupling 10 to the position shown in FIGS. 24A-24E.

FIGS. 28A-28D depict a quick action coupling 110 according to a second exemplary embodiment of the invention. The coupling 110 is substantially similar to the coupling 10 and only the primary differences between those couplings will be described hereinafter.

The ring 114 is shown in the locked position in FIGS. 28A-28D. The ring 114 differs from the ring 14 in that it includes gripping tabs 115 positioned about its outer circumference in lieu of undulations. The tabs 115 may be configured for receiving a tool that is used for rotating the ring 114. The tabs 115 also offer a gripping point for operation by hand.

The flexible locking tab 120 also differs from that of the coupling 10. The flexible locking tab 120 is configured to interact with one of the tabs 136 of the ring 114 to permit rotation of the ring 114 both to and from the locked position.

The locking tab 120, which is best shown in FIGS. 29A-29C, includes a rectangular horizontal wall 162, a vertical wall 163 extending outwardly from a short side of the rectangular horizontal wall 162, and an angled wall 164 extending from a long side of the rectangular horizontal wall 162 that adjoins the short side. The angled wall 164 is angled with respect to the horizontal wall 162 between a low edge 164a and a high edge 164b (see FIG. 29C) relative to wall 162. The horizontal wall 162 includes a hole 165 in which a pin or rivet 166 is inserted for permanently and fixedly mounting the tab 120 to the housing 112. Alternatively, the tab 120 may be welded or staked to the housing 112. According to this embodiment, the walls 162-164 are formed by bends in a unitary piece of resilient sheet metal. Those skilled in the art will recognize that locking tab 120 can be provided in a variety of forms.

In an assembled form of the coupling 110, the horizontal wall 162 of the locking tab 120 is positioned in a recess 130 (like recess 30) of the housing 112 at least partially beneath the surface of the ring 114. The angled wall 164 extends outwardly away from the exterior surface of the housing 112 and the ring 114.

The flexible locking tab 120 maintains the coupling 110 in a locked configuration and prevents the inadvertent movement of the coupling 110 from the locked state to a disengaged state. In particular, the vertical wall 163 of the locking tab 120 prevents the tab 136 of the ring 114 from being rotated from the locked state in a counterclockwise (loosening) direction, as shown in FIG. 28D.

In operation, to move the coupling 110 from the locked state shown in FIG. 28D to the disengaged state (not shown), the angled wall 164 must first be manually flexed downward toward the longitudinal axis A, which causes the vertical wall 163 to flex downwardly toward the longitudinal axis A. The ring 114 can then be rotated in a counterclockwise direction such that the tab 136 of the ring 114 passes over the free end 167 of the depressed vertical wall 163. Once the tab 136 of the ring 114 is rotated beyond the tab 120, the vertical wall 163 and the angled wall 164 spring outwardly and return to their original position shown in FIG. 28D.

To then return the coupling 110 to the locked state, the ring 114 is simply rotated in the clockwise rotational direction. More particularly, as the ring 114 is rotated in the clockwise rotational direction, the tab 136 first rides over top of and contacts the low side 164a of the wall 164. As the tab 136 continues to ride over top of the wall 164, the tab 136 forces the walls 163 and 164 to move inwardly toward the longitudinal axis A. The tab 136 then rides over top of the high side 164b of the wall 164 and the free end 167 of the vertical wall 163. Once the tab 136 clears the wall 163, the walls 163 and 164 spring outwardly away from the longitudinal axis A toward the locked state shown in FIG. 28D. The coupling 110 is then maintained in the locked state, and it is not possible to rotate the ring 114 in either rotational direction without depressing the angled wall 164, as described above.

The locking tab 120 of the coupling 110 is configured to be automatically depressed upon rotation of the ring 114 in the clockwise direction (but not the counterclockwise direction). In other words, it is not necessary to manually depress the locking tab 120 while rotating the ring 114 in the clockwise rotational direction.

FIGS. 30A-30D depict a quick action coupling 210 according to a third exemplary embodiment of the invention. The coupling 210 is substantially similar to the coupling 110 and only the primary differences between those couplings will be described hereinafter.

The coupling 110 includes a spring-loaded pin 220 that is configured for maintaining the coupling 110 in a locked state. The housing 212 is especially configured for interacting with the spring-loaded pin 220. More particularly, a tab 219 protrudes outwardly from the flange at the distal end of the housing 212. A thru-hole 221 is provided through the tab 219 for interacting with the free end 225 of the spring-loaded pin 220. Also, the edges 226 of the tab 219 are chamfered or rounded for interacting with the rounded free end 225 of the spring-loaded pin 220.

The spring-loaded pin 220 is best shown in FIG. 31. The body of the pin 220 is captively mounted to an axially extending hole 227 disposed in the ring 214, such that the pin 220 rotates along with the ring 214. A spring 218 of the spring-loaded pin 220 is positioned within the hole of the ring 214 for biasing the spring-loaded pin 220 toward the hole 221 of the housing tab 219. The spring-loaded pin 220 includes a pull-ring 223 so that a user can manually disengage the end 225 of the pin 220 from the hole 221 of the housing tab 219.

In operation, to move the coupling 210 from the locked state shown in FIG. 30D to the disengaged state (not shown), the user pulls the pull-ring 223 of the pin 220 so that the end 225 of the pin 220 disengages from the hole 221 of the housing tab 719. The ring 214 can then be rotated in a counterclockwise rotational direction to the disengaged state.

To then return the coupling 210 to the locked state, the ring 214 is rotated in the clockwise rotational direction. As the ring 214 is rotated in the clockwise rotational direction, the rounded free end 225 of the spring-loaded pin 220 first engages the chamfered edge 226 of the housing tab 219. Further rotation of the ring 214 in the clockwise rotational direction causes the pin 220 to move proximally against the bias of its spring 218 as the rounded free end 225 of the spring-loaded pin 220 rides along the rear facing surface of the tab 219. Once the rounded free end 225 of the spring-loaded pin 220 becomes rotationally aligned with the hole 221 of the housing tab 219, the pin 220 springs distally into the hole 221 thereby locking the coupling 210, as shown in FIG. 30D. It is not possible to rotate the ring 214 in either rotational direction once the spring-loaded pin 220 is positioned within the hole 221 without pulling the pin 220, as described above.

FIGS. 32A-32D depict a quick action coupling 310 according to a fourth exemplary embodiment of the invention. The coupling 310 is substantially similar to the coupling 210 and only the primary differences between those couplings will be described hereinafter.

The coupling 310 includes a spring-loaded lever 320 for maintaining the coupling 310 in a locked state. The lever 320 includes a locking end 325 for interacting with a slot 319 that is defined on the flange at the distal end of the housing 312. The spring-loaded lever 320 is best shown in FIG. 33. The spring-loaded lever 320 is mounted to the ring 314 by a pin 324 that is positioned through a hole 323 in the center of the lever 320. In use, the lever 320 rotates along with the ring 314 as the ring 314 rotates about the housing 312. The lever 320 is configured to pivot about the pin 324. A spring 318 of the spring-loaded lever 320 is positioned within a hole of the ring 314. The spring 318 is positioned to bias the locking end 325 of the spring-loaded lever 320 toward the slot 319 of the housing 312. The spring-loaded lever 320 includes a proximal end 329, opposite of the free end 325, for grasping or touching by a user.

In operation, to move the coupling 310 from the locked state shown in FIG. 32D to a disengaged state (not shown), the user depresses the proximal end 329 of the lever 320 inwardly (i.e., toward the longitudinal axis) so that the locking end 325 of the lever 320 pivots outwardly about the pin 324 and disengages from the slot 319 of the housing 312. The ring 314 can then be rotated in a counterclockwise rotational direction to the disengaged state.

To then return the coupling 310 to the locked state, the ring 314 is rotated in the clockwise rotational direction. As the ring 314 is rotated in the clockwise rotational direction, the locking end 325 of the lever 320 slides along a ramped outer surface 327 of the housing 312. Once the locking end 325 of the lever 320 becomes rotationally aligned with the slot 319 formed at the terminal end of the ramped surface 327, the locking end 325 of the lever 320 springs forwardly into the slot 319 thereby locking the coupling 310, as shown in FIG. 32D. It is not possible to rotate the ring 314 in either rotational direction once the locking end 325 is positioned within the slot 319 without manually pivoting the lever 320, as described above.

FIGS. 34-44 depict a quick action coupling 510 according to a fifth exemplary embodiment of the invention. The coupling 510 is substantially similar to the coupling 10, and the primary differences between those couplings will be described hereinafter.

In general, the ring 14 of the coupling 10 is moved between the engaged and disengaged states by rotation, whereas the ring 514 of the coupling 510 is moved between the engaged and disengaged states by translation.

The coupling 510 generally comprises a hollow cylindrical housing 512; a ring 514 mounted to the exterior of the housing 512; three moveable members 516 that are mounted beneath the ring 514 for interacting with the recess 17 formed in the mating adapter 18 (see FIG. 24A); and, a seal 521 that is positioned within the interior of the housing 512 for abutting a proximal end of the mating adapter 18. Although not shown, the coupling 510 may include a locking tab, pin or lever, as is disclosed in FIGS. 1, 28A, 30A and 32A, that is configured for maintaining the coupling 510 in a locked state.

Referring now to the individual components of the coupling 510, FIGS. 45-47 depict various views of the housing 512. The housing 512 includes a wall having a hollow cylindrical shape extending between the proximal end 522 and a distal end 524 along a central longitudinal axis 'A.'

A series of three openings 528 are provided through the wall of the housing 512, like the openings 28 of the housing 12. In an assembled form of the coupling 510, each opening 528 is configured to interact with one of the moveable members 516. The number of openings 528 may vary depending upon the number of moveable members 516 employed. Each opening 528 includes a rectangular portion 528a and two discrete slots 528b extending in a distal direction from the rectangular portion 528a. The openings 528 are evenly spaced apart about the circumference of the housing 512 by about 120 degrees, for example.

A recess 532 having a rounded concave shape extends radially from opposite sides of each opening 528. In an assembled form of the coupling 510, a pivot arm of each moveable member 516 is pivotally positioned in the recess 532.

A recess 538 extends about the entire circumference of the interior surface of the housing 512. The recess 538 is squared-off and includes two interior corners facing each other. The annular seal 521, which may be either pressure sensitive or not pressure sensitive, is positioned within the recess 538.

FIGS. 48-54 depict the ring 514 of the coupling 510. The ring 514 includes a substantially annular body. The exterior surface of the ring 514 includes projections for grasping by a user of the coupling. The exterior surface could also include provisions for interfacing with a tool. The interior surface of the ring 514 includes a series of tracks 536 having ramped surfaces to accomplish pivoting of the moveable members 516 between engaged and disengaged positions. The tracks 536 are evenly spaced apart about the circumference of the housing 512 by about 120 degrees. In an assembled form of the coupling 510, each track 536 is assigned to a single moveable member 516 for pivoting that moveable member 516 between the engaged and disengaged positions. Although only one track 536 will be described hereinafter, it should be understood that all of the tracks 536 are structurally and functionally equivalent.

As best shown in FIG. 54, the track 536 includes an engaging ramp 544 extending between the proximal and distal ends of the ring 514. The engaging ramp 544 is configured to pivot its moveable member 516 toward the engaged state when the ring 514 is translated in a proximal direction as shown in FIG. 34. Each ramp 544 includes a first portion 544a at the proximal end of the ring 514, a second portion 544b, a third portion 544c, and a fourth portion 544d at the distal end of the ring 514. The portions 544a-544d intersect one another, as shown.

The first portion 544a is substantially flat in an axial direction and is positioned furthest from the central longitudinal axis 'A' as compared with the other portions of the ramp 544. The second portion 544b extends toward the central longitudinal axis 'A' as viewed in a distal direction, and may have a constant or variable slope. The second portion 544b may be referred to as a rapid engaging section. The third portion 544c also extends toward the central longitudinal axis 'A' as viewed in the distal direction, but is angled to a lesser degree than the second portion 544c. The third portion 544c may also have a constant or variable slope. The third portion 544c may be referred to as a mechanical advantage section. The fourth portion 544d is substantially flat (and/or slightly angled) in an axial direction and is positioned closest to the central longitudinal axis 'A.'

The track 536 also includes a releasing ramp 546 extending between the proximal and distal ends of the ring 514. The releasing ramp 546 is configured to pivot the moveable member 516 toward the disengaged state when the ring 514 is translated in a distal direction as shown in FIG. 40. The ramp 546 comprises two discrete surfaces that are positioned on opposite sides of the engaging ramp 544, as best seen in FIGS. 48, 49 and 52.

As best shown in FIG. 53, each discrete surface of the ramp 546 includes a first portion 546a at the distal end of the ring 514, a second portion 546b, and a third portion 546c at the proximal end of the ring 514.

The portions 546a-546c intersect one another, as shown. The first portion 546a is substantially flat in an axial direction and is positioned furthest from the central longitudinal axis 'A' as compared with the other portions of the ramp 546. The first portion 546a may have a constant or variable slope. The second portion 546b is angled with respect to the longitudinal axis 'A' and extends toward the central longitudinal axis 'A' as viewed in a proximal direction. The third portion 546c is substantially flat (and/or slightly angled) in an axial direction and is positioned closest to the central longitudinal axis 'A.' The third portion 546c may have a constant or variable slope.

FIGS. 55-57 depict one moveable member 516 of the coupling 510. It should be understood that the other two moveable members 516 of the coupling 510 are structurally and functionally equivalent to the moveable member 516 shown in FIGS. 55-57.

The moveable member 516 includes a solid body 516a, two prongs 516b extending outwardly from the proximal end of the solid body 516a, and two pivot arms 556 extending outwardly in a radial direction from the solid body 516a. The pivot arms 556 may be integral with the solid body 516a, as shown, or they may comprise one or more separate pins that are interested into the solid body 516a. In an assembled form of the coupling 510, and with reference to FIGS. 45, 46 and 55, the solid body 516a pivots through the rectangular portion 528a (FIG. 45) of one of the openings 528 of the housing 512, the prongs 516b pivot through respective slots 528b (FIG. 45) of said opening 528, and the pivot arms 556 reside in respective recesses 532 extending from said opening 528.

Each moveable member 516 includes multiple surfaces for engaging with one of the engaging ramps 544 and one of the releasing ramps 546 of the ring 514. A releasing surface 550 is defined at least partially on the top and rear sides of the prongs 516b of the moveable member 516 for interacting with one of the releasing ramps 546, as shown in FIG. 39. The releasing surface 550 is rounded.

The top side of the moveable member 516 includes an upwardly protruding portion 516c having a width that is sized to fit within the slot of the engaging ramp 544. A bearing surface 552 is defined on the protruding portion 516c of the moveable member 516 for interacting with one of the engaging ramps 544. Another bearing surface 553, which is also defined on the protruding portion 516c of the moveable member 516, is provided for interacting with one of the engaging ramps 544. An engagement surface 554 is defined on the front side of the moveable member 516. The engagement surface 554 is sized for engaging the recess 17 formed in the mating adapter 18. The bottom end of the moveable member 516 includes a cylindrical surface 560 that is configured to permit the passage and release of the mating adapter 18 into and out of the housing 512 when the moveable member 516 is pivoted to the disengaged position (see FIG. 43). The cylindrical surface 560 is contoured to sit flush with the inner surface of the housing 512 when the moveable member 516 is pivoted to the disengaged position.

Referring now to the operation of the coupling 510 shown in FIGS. 34-44, the coupling 510 is initially maintained in the decoupled state. In the decoupled state, the adapter 18 is decoupled from the coupling 510, and the coupling 510 is maintained in a disengaged state ready to receive the adapter 18.

In the decoupled (and disengaged) state of the coupling 510 shown in FIGS. 40-44, the surface 546c of each releasing ramp 546 of the ring 514 bears on the releasing surface 550 of a respective moveable member 516. Accordingly, each moveable member 516 is pivoted to a rotational position wherein the cylindrical surface 560 of the moveable member 516 is flush with the interior surface of the housing 512 and the coupling 510 is ready to receive the adapter 18.

Although not shown in these figures, the adapter 18 is then inserted through the opening at the distal end 511 of the coupling 510 and translated in the distal direction through the interior of the coupling 510 until the distal end of the adapter 18 approaches and lightly contacts the seal 521. The coupling 510 is still maintained in the disengaged state.

The coupling 510 is then moved from the disengaged state of FIGS. 40-44 toward the engaged state of FIGS. 34-39.

More particularly, the ring 514 is translated in the distal direction, which is depicted by the arrow in FIG. 44. As the ring 514 is translated, the surface 544b of each engaging ramp 544 gradually contacts the surfaces 552 and 553 of its respective moveable member 516 and consequently pivots the moveable member 516 about its pivot arms 556 causing the engagement surface 554 of the moveable member 516 to move into the recess 17 of the adapter 18. At the same time, the surface 546b of each releasing ramp 546 gradually separates from the releasing surface 550 of its respective moveable member 516 to permit the aforementioned pivoting action of the moveable member 516. As best shown in FIG. 40, engagement between the protruding portion 516c (FIG. 55) and the slot formed by the ramp 544 prevents relative rotation between the ring 514 and the housing 512.

As the ring 514 is translated further in the distal direction, the surface 544c of each engaging ramp 544 gradually contacts the surface 553 of its respective moveable member 516 and further pivots the moveable member 516 causing the engagement surface 554 of the moveable member 516 to move further into the recess 17 of the adapter 18 (not shown). At the same time, the surface 546b of each releasing ramp 546 permits further rotation of the releasing surface 550 of the moveable member 516.

As the ring 514 is translated even further in the distal direction, the surface 544d of each engaging ramp 544 gradually contacts the surface 552 of its respective moveable member 516 and further pivots the moveable member 516 causing the engagement surface 554 of the moveable member 516 to move further into the recess 17 of the adapter 18 (not shown). At the same time, the surface 546c of each releasing ramp 546 permits further rotation of the releasing surface 550 of the moveable member 516 toward the engaged position. As the engagement surface 554 of the moveable member 516 moves further into the recess 17 of the adapter 18, the adapter 18 is urged in the distal direction by at least 0.025 inches (by way of non-limiting example) until the distal end of the adapter 18 sufficiently compresses the seal 521, thereby creating a substantially fluid-tight interface between the seal 521 and the distal end of the adapter 18.

At this point, the adapter 18 is now fully engaged with the coupling 510, and fluid may be delivered through the coupling 510 and the adapter 18. Also, at this point, the ring 514 cannot be translated further in the distal direction. Although not shown, the coupling 510 may include a locking tab, pin or other means, as shown in FIGS. 28A, 30A and 32A, to automatically maintain the coupling 510 in a locked state once the ring 514 is moved to the position shown in FIGS. 34-39 to prevent inadvertent disengagement between the adapter 18 and the coupling 510. Also, although not shown, the coupling 510 could include a visual indicator on the ring 514 and/or the housing 512 indicating when the coupling 510 is maintained in a locked (or engaged) state. The visual indicator would enable a user to determine the state of the coupling 510 from a distance.

To decouple the adapter 18 from the coupling 510, any locking feature (not shown) would first be unlocked by an end user. Thereafter, the ring 514 is translated in the proximal direction from the position shown in FIGS. 34-39 to the position shown in FIGS. 40-44. As the ring 514 is translated in the proximal direction, the surface 544c of each engaging ramp 544 gradually permits the surface 552 to pivot outward as the engagement surface 554 of the moveable member 516 slowly withdraws from the recess 17 of the adapter 18. The surface 546b of each releasing ramp 546 then gradually contacts the surface 550 of its respective moveable member 516, which causes each moveable member 516 to pivot in the opposite rotational direction about its pivot arms 556.

As the ring 514 is translated further in the proximal direction, the surface 546c of each releasing ramp 546 gradually contacts the surface 550 of its respective moveable member 516, which causes each moveable member 516 to pivot further about its pivot arms 556. At the same time, the surface 544b (and then 544a) of each engaging ramp 544 permits further outward rotation of the surface 552. Each moveable member 516 pivots until the engagement surface 554 of the moveable member 516 is completely withdrawn from the recess 17 of the adapter 18. At this point, the coupling is in the disengaged state shown in FIGS. 40-44. A ring, tang, lock or tab may prevent complete detachment of the ring 514 from the housing 512 in the axial direction. The adapter 18 may then be translated away from the coupling 510.

As noted above, the couplings may vary from that which is shown and described. For example, the number of ramps and moveable members can vary. The angle of each ramped surface can vary to achieve a specific purpose. The overall shape of the ring and housing may be non-circular and/or keyed to prevent the inadvertent attachment of an incorrect adapter (e.g., to distinguish between couplings for different types of media, such as diesel fuel and non-diesel fuel).

Although the invention is illustrated and described herein with reference to specific examples, the invention is not intended to be limited to the details shown. Rather, various modifications may be made in the details within the scope and range of equivalents of the claims and without departing from the invention.

What is claimed is:

1. A coupling comprising:
    a housing including a wall defining an interior space extending along a central longitudinal axis and at least one opening disposed in the wall;
    a ring movably mounted about an exterior surface of the wall;
    at least one moveable member at least partially positioned through the opening and being movably mounted between the ring and the wall of the housing, the moveable member having an engagement surface for engaging with a mating adapter that is positionable within the interior space of the housing;
    at least one engaging ramp defined on the ring for moving the engagement surface of the moveable member toward the central longitudinal axis upon moving the ring in one direction in order to engage the coupling to the adapter; and
    at least one releasing ramp defined on the ring for moving the engagement surface of the moveable member away from the central longitudinal axis upon moving the ring in an opposite direction in order to disengage the coupling from the adapter,
    wherein the engaging ramp and the releasing ramp are formed on separate surfaces of the ring.

2. The coupling of claim 1 further comprising a pivot rib on the ring positioned between the engaging ramp and the releasing ramp.

3. The coupling of claim 1, wherein the ring is either (i) rotatably mounted to the exterior surface of the wall for rotating between said one direction and said opposite direction, or (ii) translatably mounted to the exterior surface of the wall for translating between said one direction and said opposite direction.

4. The coupling of claim 1, wherein the engaging ramp is a surface defined on the ring that faces the exterior surface of the housing, the engaging ramp includes two ramp portions, and a first ramp portion of the two ramp portions of the engaging ramp is spaced further from the central longitudinal axis than a second ramp portion of the two ramp portions of the engaging ramp.

5. The coupling of claim 4, wherein when the second ramp portion of the two ramp portions of the engaging ramp bears on the movable member, the movable member is moved toward the central longitudinal axis and the coupling is engaged to the adapter.

6. The coupling of claim 1, wherein the releasing ramp is a surface defined on the ring that faces the exterior surface of the housing, the releasing ramp includes two ramp portions, and a first ramp portion of the two ramp portions of the releasing ramp is spaced further from the central longitudinal axis than a second ramp portion of the two ramp portions of the releasing ramp.

7. The coupling of claim 6, wherein when the second ramp portion of the two ramp portions of the releasing ramp bears on the moveable member, the moveable member is moved away from the central longitudinal axis and the coupling is disengaged from the adapter.

8. The coupling of claim 1, wherein the moveable member includes a first end upon which the engagement surface is defined, a second end opposite the first end, and a pivot surface disposed between the first end and the second end about which the moveable member pivots.

9. The coupling of claim 8, wherein the first end of the moveable member is directly contacted by the engaging ramp upon moving the ring in said one direction for pivoting the engagement surface of the moveable member toward the central longitudinal axis.

10. The coupling of claim 9, wherein the second end of the moveable member is directly contacted by the releasing ramp upon moving the ring in said opposite direction for pivoting the engagement surface of the moveable member away from the central longitudinal axis.

11. The coupling of claim 8, wherein the first end of the moveable member is directly contacted by the engaging ramp upon moving the ring in said one direction for pivoting the engagement surface of the moveable member toward the central longitudinal axis, and the second end of the moveable member is directly contacted by the releasing ramp upon moving the ring in said opposite direction for pivoting the engagement surface of the moveable member away from the central longitudinal axis.

12. The coupling of claim 1 further comprising means for preventing the ring from being moved in said opposite direction once the coupling is engaged to the adapter, and wherein the means is movable so that the ring can be moved in said opposite direction in order to disengage the coupling from the adapter.

13. The coupling of claim 1 further comprising a plurality of moveable members, a plurality of engaging ramps, and a plurality of releasing ramps, wherein each moveable member of the plurality of moveable member interacts with one of the engaging ramps and one of the releasing ramps.

14. A coupling comprising:
a housing including a wall defining an interior space extending along a central longitudinal axis;
a ring movably mounted with respect to the wall;
at least one moveable member having an engagement surface for engaging with an adapter that is positionable within the interior space of the housing; and
one or more ramps defined on the ring for (i) moving the engagement surface of the moveable member toward the central longitudinal axis upon moving the ring in one direction in order to engage the coupling to the adapter, and (ii) moving the engagement surface of the moveable member away from the central longitudinal axis upon moving the ring in an opposite direction in order to disengage the coupling from the adapter,
wherein the one or more ramps comprises at least one engaging ramp defined on the ring for moving the engagement surface of the moveable member toward the central longitudinal axis upon moving the ring in said one direction in order to engage the coupling to the adapter,
wherein the one or more ramps comprises at least one releasing ramp defined on the ring for moving the moveable member surface of the moveable member away from the central longitudinal axis upon moving the ring in said opposite direction in order to disengage the coupling from the adapter, and
wherein the engaging ramp and the releasing ramp are formed on separate surfaces of the ring.

15. The coupling of claim 14, wherein the moveable member includes a first end upon which the engagement surface is defined, a second end opposite the first end, and a pivot surface disposed between the first end and the second end about which the moveable member pivots.

16. The coupling of claim 15, wherein the first end of the moveable member is directly contacted by the engaging ramp upon moving the ring in said one direction to pivot the engagement surface of the moveable member toward the central longitudinal axis, and the second end of the moveable member is directly contacted by the releasing ramp upon moving the ring in said opposite direction to pivot the engagement surface of the moveable member away from the central longitudinal axis.

17. The coupling of claim 14, wherein the ring is either (i) rotatably mounted to the wall for rotating between said one direction and said opposite direction, or (ii) translatably mounted to the wall for translating between said one direction and said opposite direction.

18. A coupling comprising:
a housing including a wall defining an interior space extending along a central longitudinal axis;
a ring movably mounted with respect to the wall;
at least one moveable member having a rounded engagement surface for engaging and establishing three-dimensional surface contact with a rounded surface of an adapter that is positionable within the interior space of the housing; and
one or more ramps defined on the ring for (i) moving the rounded engagement surface of the moveable member toward the central longitudinal axis upon moving the ring in one direction in order to engage the coupling to the adapter, and (ii) moving the rounded engagement surface of the moveable member away from the central longitudinal axis upon moving the ring in an opposite direction in order to disengage the coupling from the adapter,
wherein the rounded engagement surface of the moveable member and the rounded surface of the adapter are each rounded in X, Y and Z directions of an XYZ axis Cartesian coordinate system.

19. The coupling of claim 18 wherein the three-dimensional surface contact extends about the central longitudinal axis and in a plane that passes through the central longitudinal axis.

* * * * *